(12) United States Patent
Chang et al.

(10) Patent No.: US 8,610,375 B2
(45) Date of Patent: Dec. 17, 2013

(54) ADAPTIVE BLEEDER CIRCUIT

(75) Inventors: Lon-Kou Chang, Hsinchu (TW); Chang-Yu Wu, Hsinchu (TW); Li-Wei Yen, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 347 days.

(21) Appl. No.: 13/183,007

(22) Filed: Jul. 14, 2011

(65) Prior Publication Data

US 2012/0188794 A1    Jul. 26, 2012

(30) Foreign Application Priority Data

Jan. 26, 2011 (TW) .............................. 100102908 A

(51) Int. Cl.
*H05B 37/02* (2006.01)

(52) U.S. Cl.
USPC ............................ 315/307; 315/297; 323/237

(58) Field of Classification Search
USPC ................ 323/222, 224, 225, 282–289, 905; 315/85, 245, 192, 127, 247, 224, 291, 315/297, 307
See application file for complete search history.

(56) References Cited

U.S. PATENT DOCUMENTS

| 7,256,554 | B2 * | 8/2007 | Lys ................................ 315/291 |
| 7,872,427 | B2 | 1/2011 | Scianna |
| 8,111,017 | B2 * | 2/2012 | Lin et al. ........................ 315/307 |
| 2012/0126714 | A1 * | 5/2012 | Deppe et al. .................. 315/192 |

OTHER PUBLICATIONS

Catalog of National Semiconductor, LM3445 Triac Dimmable Offline LED Driver, Sep. 22, 2010.
Catalog of National Semiconductor, LM3450 LM3450A LED Drivers with Active Power Factor Correction and Phase Dimming Decoder, Jun. 20, 2011.
Catalog of NXP Semiconductors, SSL2101 SMPS IC for dimmable LED lighting, Aug. 28, 2009.

* cited by examiner

*Primary Examiner* — Rajnikant Patel
(74) *Attorney, Agent, or Firm* — Morris Manning & Martin LLP; Tim Tingkang Xia, Esq.

(57) ABSTRACT

An adaptive bleeder circuit is applicable to a power converter, in which the power converter has a transformer primary side and a transformer secondary side, and the power converter enables input power to be selectively input or not input to the transformer primary side through a pulse-width-modulated signal. The adaptive bleeder circuit includes a switched bleeder circuit, and the bleeder circuit switch dynamically adjusts a turn on/off ratio (or referred to as duty ratio) of the switch element according to the TRIAC holding current and the converter input current of an alternating current (AC) TRIAC. When the input current is less than the holding current, the bleeder circuit increases conduction time ratio of the pulse-width-modulated signal, such that the input current recovers to the holding current to maintain normal conduction of the AC TRIAC.

12 Claims, 24 Drawing Sheets

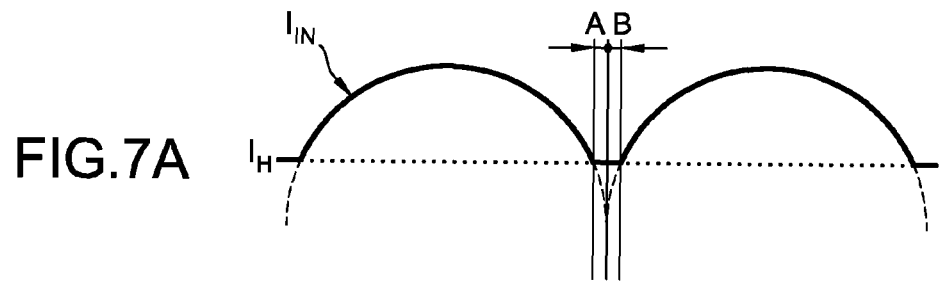
FIG.7A
FIG.7B
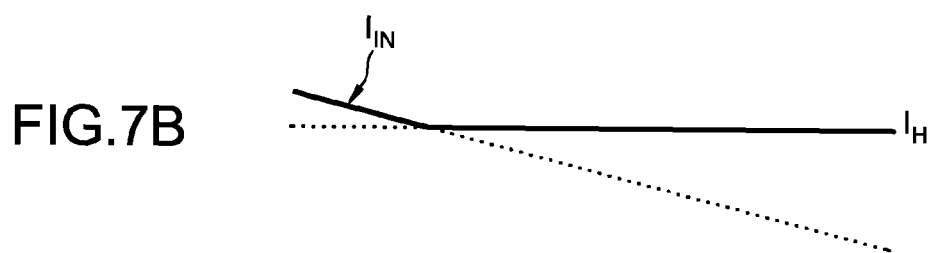
FIG.7C
FIG.7D
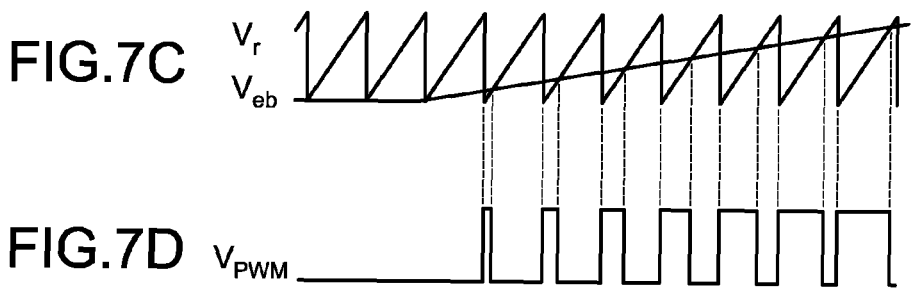
FIG.7E
FIG.7F
FIG.7G

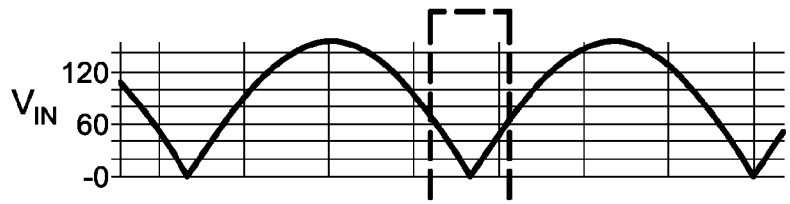
FIG.15A $V_{IN}$
FIG.15B $I_{IN}$
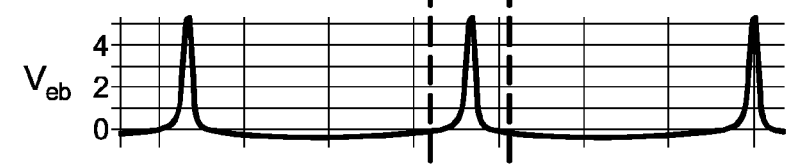
FIG.15C $V_{eb}$
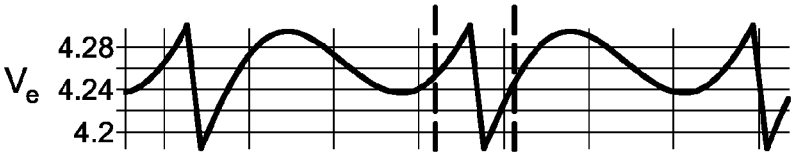
FIG.15D $V_e$
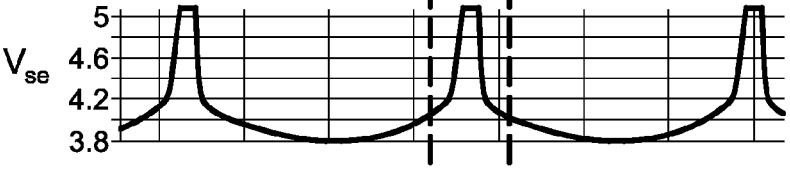
FIG.15E $V_{se}$
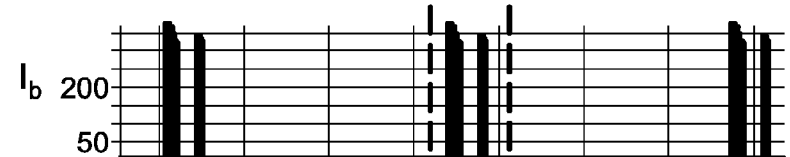
FIG.15F $I_b$
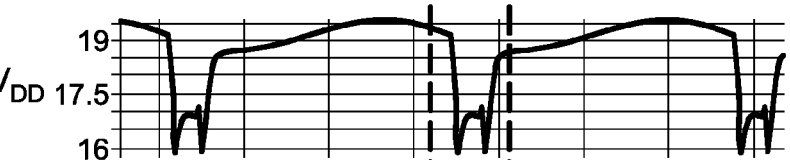
FIG.15G $V_{DD}$
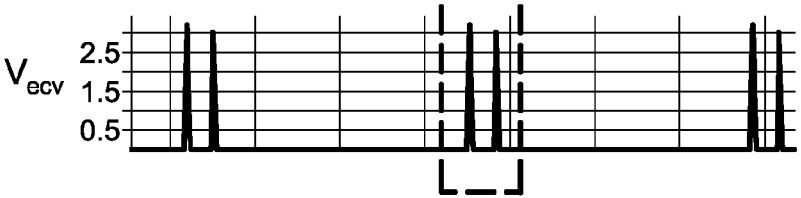
FIG.15H $V_{ecv}$

ADAPTIVE BLEEDER CIRCUIT

CROSS-REFERENCE TO RELATED APPLICATIONS

This non-provisional application claims priority under 35 U.S.C. §119(a) on Patent Application No(s). 100102908 filed in Taiwan, R.O.C. on Jan. 26, 2011, the entire contents of which are hereby incorporated by reference.

BACKGROUND

1. Field

The present disclosure relates to a bleeder circuit, and more particularly to an adaptive bleeder circuit having a bleeder to dynamically compensate a required holding current needed for keeping TRIAC turning on for Alternating Current (TRIAC) dimming control application.

2. Related Art

At night or under insufficient natural light circumstances, artificial illumination may be adopted to provide sufficient illuminance by using a lighting device to project light. However, ordinary artificial illumination usually consumes much power. If the light is dimmed to a darker level (such as 25-50% of the original luminance) under a condition that high illuminance is not required, the energy may be effectively saved. A common dimmer, for example, can be a TRIAC dimmer, an electronic dimmer, or a remote control dimmer (such as an infrared or radio-frequency remote control dimmer).

Generally, the TRIAC dimmer mainly includes a TRIAC used for changing input power of the lighting device. The TRIAC normally maintains a conduction state (on-state) after being activated, and will not be cut off until the current flowing through the TRIAC decreases to be lower than a holding current. When the light is dimmed downward manually, both the input voltage and input current of the lighting device will decrease accordingly. This eventually results in that the current of the TRIAC is less than the holding current such that the TRIAC is cut off unexpectedly, and a flicker problem of the lighting device occurs. In order to alleviate the flicker problem that may occur during dimming, a conventional solution is to add a bleeder or dummy load as the circuit to keep the current flowing through the TRIAC higher than the holding current flowing through TRIAC. By this way, the TRIAC can be kept on successfully at every firing angle without flickering even in the smaller dimming cases.

A common method in the prior art is to connect a constant resistor in parallel with the line input terminals to serve as the bleeder circuit. The extra current extracted from the line input by the bleeder circuit is used for assuring that the line input current is greater than the holding current required for keeping turning on during the normal conduction cycle. However, it should be noted that, since the bleeder circuit uses a constant resistor, the extracted current, relevant to the impedance of the resistor, will vary with the input line voltage. Accordingly, the bleeder circuit cannot dynamically compensate the TRIAC for the exact required current, which will cause much extra power consumed in the bleeder circuit.

In addition, the current extracted by the conventional bleeder circuit is in direct proportion to the input voltage. In other words, since the current extracted by the bleeder circuit is rather limited, when the input voltage is too low, the bleeder circuit cannot provide the TRIAC with the required line current, and the TRIAC will be cut off eventually. When the input voltage is too high, the current extracted by the bleeder circuit also increases accordingly. This will cause extra power being consumed on the bleeder circuit, and result in low working efficiency of the whole line.

SUMMARY

Accordingly, the present disclosure is an adaptive bleeder circuit, so as to solve the problems in the prior art.

The present disclosure provides an adaptive bleeder circuit which is applicable to a power converter. The power converter comprises a transformer (the transformer comprises a primary side and a secondary side), a switch element, a diode, and an output capacitor. The power converter controls the switch element through a pulse-width-modulated signal, so that the input voltage of the power converter is selectively input (connected) or not input (connected) to the transformer primary side according to on or off state of the switch element. The adaptive bleeder circuit comprises a bleeder circuit. The transformer primary side has an alternating current (AC) TRIAC, and the line current (that is, the input current of the power converter) flowing through the AC TRIAC needs to be greater than a holding current in order to enable the AC TRIAC turned on. Therefore, the bleeder circuit adjusts a switch on/off ratio (or referred to as duty ratio) of the pulse-width-modulated signal according to the holding current and the input current. When the input current is less than the holding current, the bleeder circuit recovers input current of the converter to the holding current by increasing the on-state time of the switch element.

According to an embodiment of the present disclosure, the bleeder circuit comprises a first error amplifier, a second error amplifier, an adder, and a first comparator. The first error amplifier outputs a first error signal according to a current detection signal of the transformer primary side and a reference current signal, and the current detection signal is corresponding to the input current flowing through the AC TRIAC. The second error amplifier outputs a second error signal according to a sensed signal of the transformer secondary side and a reference voltage signal. The adder is connected to the first error amplifier and the second error amplifier, and outputs a primary control signal by adding the first error signal and the second error signal. The first comparator receives the primary control signal, compares the primary control signal with a ramp signal, and outputs the pulse-width-modulated signal.

Therefore, the adaptive bleeder circuit of the present disclosure controls on and off states of the switch element for the bleeder circuit by the pulse-width-modulated signal, so as to dynamically adjust the switch on/off ratio (duty ratio) of the pulse-width-modulated signal when the input current flowing through the AC TRIAC is less than the holding current. Consequently, the input current recovers to the holding current in order to maintain normal operation of the AC TRIAC and the power converter.

BRIEF DESCRIPTION OF THE DRAWINGS

The present disclosure will become more fully understood from the detailed description given herein below for illustration only, and thus are not limitative of the present disclosure, and wherein:

FIGS. 7A to 7D are timing waveform diagrams of the current at each node when an input current is less than a holding current and the input current decreases continuously in an adaptive bleeder circuit according to an embodiment of the present disclosure;

FIGS. 7E to 7G are timing waveform diagrams of the current at each node when an input current is enabled to be greater than a holding current in an adaptive bleeder circuit according to an embodiment of the present disclosure;

FIGS. 15A to 15H are simulated waveform diagrams of an adaptive bleeder circuit applied in a power converter according to the present disclosure;

DETAILED DESCRIPTION

The detailed features and advantages of the present disclosure are described below in great detail through the following embodiments, the content of the detailed description is sufficient for those skilled in the art to understand the technical content of the present disclosure and to implement the present disclosure there accordingly. Based upon the content of the specification, the claims, and the drawings, those skilled in the art can easily understand the relevant objectives and advantages of the present disclosure.

Figure 1:
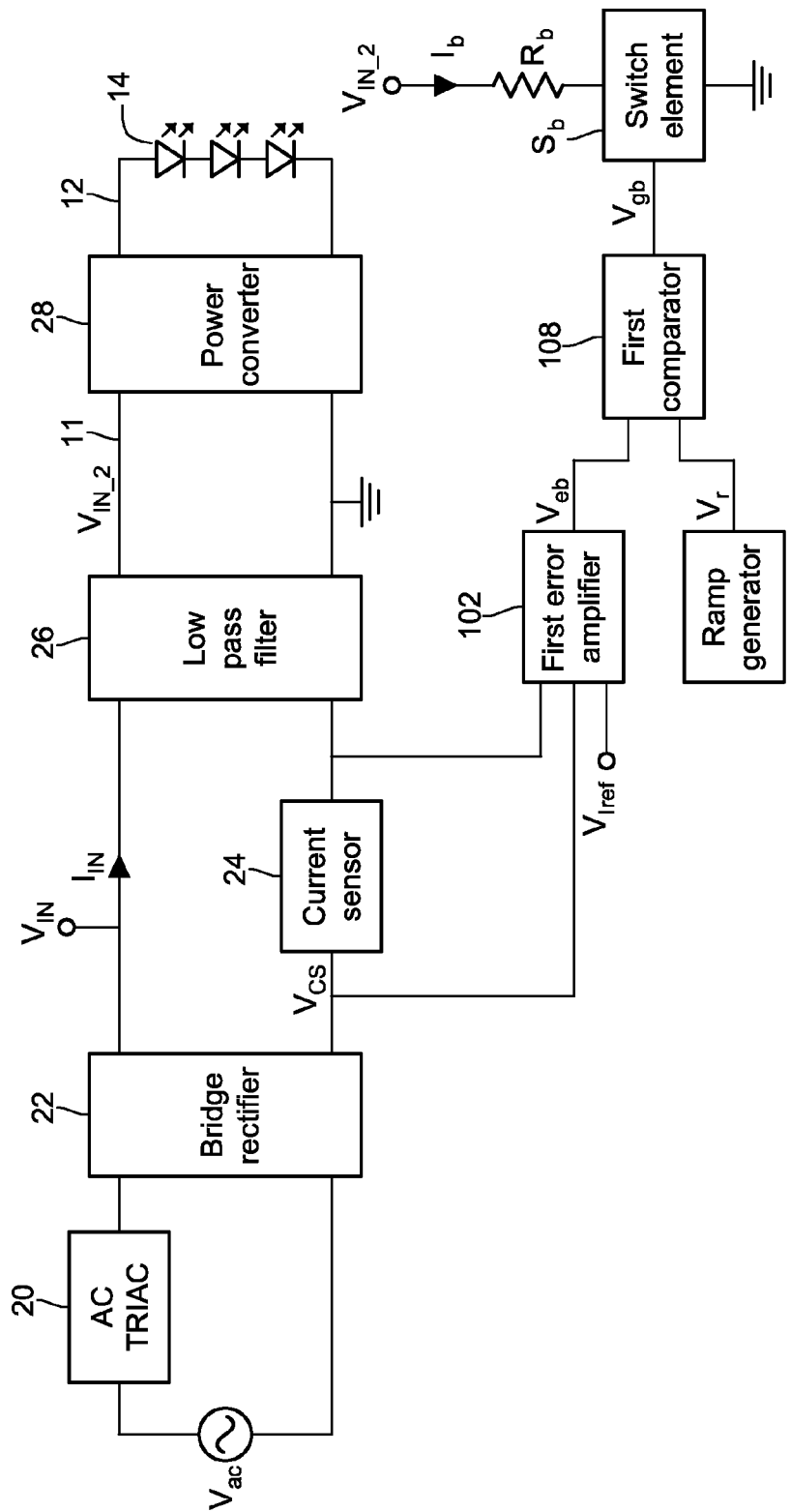
FIG. 1 is a circuit block diagram of an adaptive bleeder circuit applied in a power converter according to an embodiment of the present disclosure.
Figure 2:
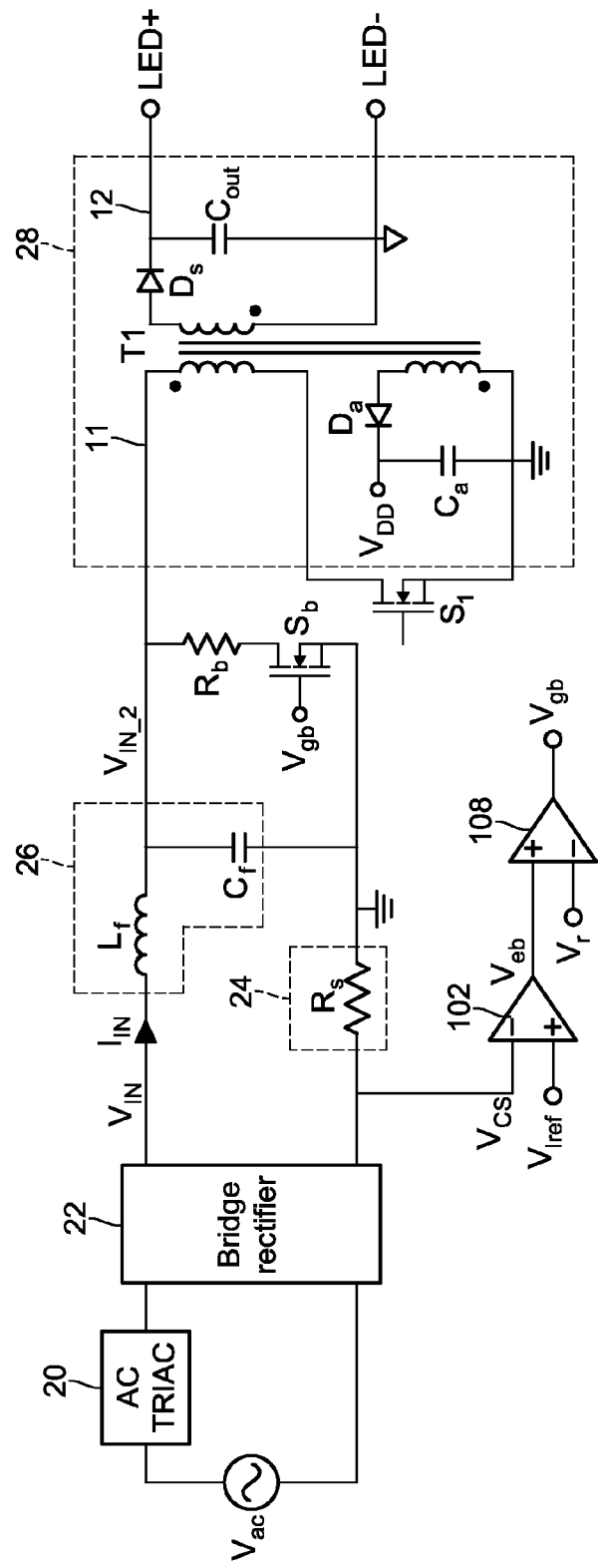
FIG. 2 is a detailed schematic circuit diagram of FIG. 1.

FIG. 1 is a circuit block diagram of an adaptive bleeder circuit applied in a power converter according to an embodiment of the present disclosure, and FIG. 2 is a detailed schematic circuit diagram of FIG. 1. The adaptive bleeder circuit of the present disclosure may be applied to a primary side of power converter, and the power converter is not limited to an isolated converter. In other embodiments of the present disclosure, as shown in FIGS. 16 to 21, the adaptive bleeder circuit of the present disclosure may also be applied to a forward converter, a half-bridge converter, a full-bridge converter, or a push-pull converter.

The adaptive bleeder circuit mainly comprises a bleeder circuit. The bleeder circuit comprises a first error amplifier 102 and a first comparator 108, and the first error amplifier 102 is connected to a current sensor 24. The first error amplifier 102 outputs a first error signal $V_{eb}$ according to a current detection signal $V_{cs}$ and a reference current signal $V_{Iref}$. Then, the first comparator 108 receives the first error signal $V_{eb}$ and outputs a switching signal (or referred to as pulse-width-modulated signal) $V_{gb}$ by compares the first error signal $V_{eb}$ with a ramp signal $V_r$. The bleeder circuit is mainly used for outputting the switching signal $V_{gb}$, and determining whether to turn on a switch element $S_b$ by controlling a switch on/off ratio (or referred to as duty ratio) of the switching signal $V_{gb}$. As such, when an input current $I_{IN}$ flowing through an AC TRIAC 20 is insufficient (for example, $I_{IN}$ is less than a holding current $I_H$), the bleeder circuit increases the duty ratio of the switching signal $V_{gb}$, so as to enable the input current $I_{IN}$ to approach the holding current $I_H$. The technical feature of using the bleeder circuit to enable the input current $I_{IN}$ to be greater than the holding current $I_H$ is illustrated below in detail with reference to the following embodiments.

It should be noted that, the adaptive bleeder circuit is not limited to the application to the primary side of the power converter 28, an application of the adaptive bleeder circuit to an auxiliary side of the power converter 28 may also be taken as an exemplary embodiment of the present disclosure, but the scope of present disclosure is not limited thereto.

Figure 3:
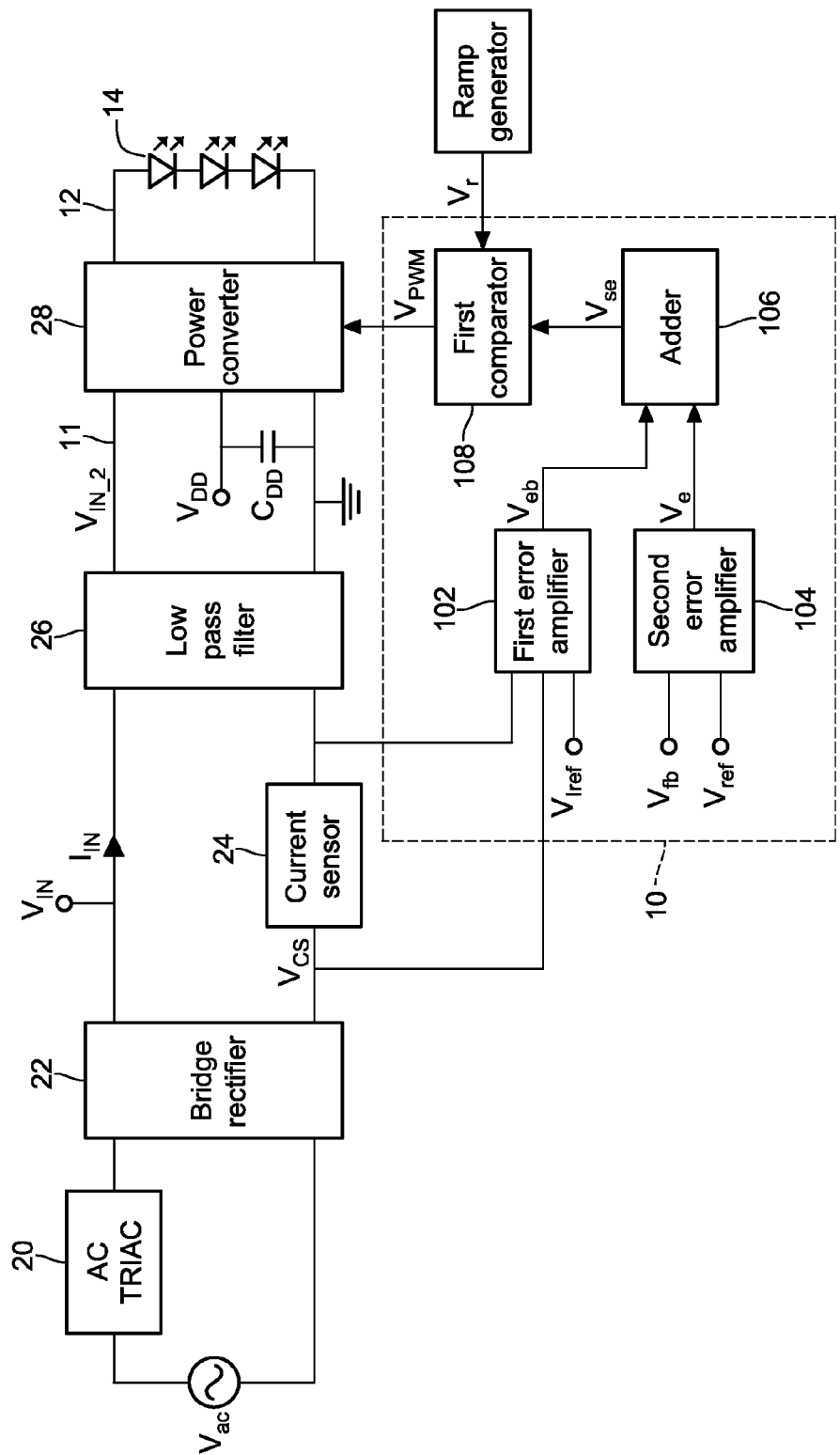
FIG. 3 is a circuit block diagram of an adaptive bleeder circuit applied in a power converter according to an embodiment of the present disclosure.
Figure 4:
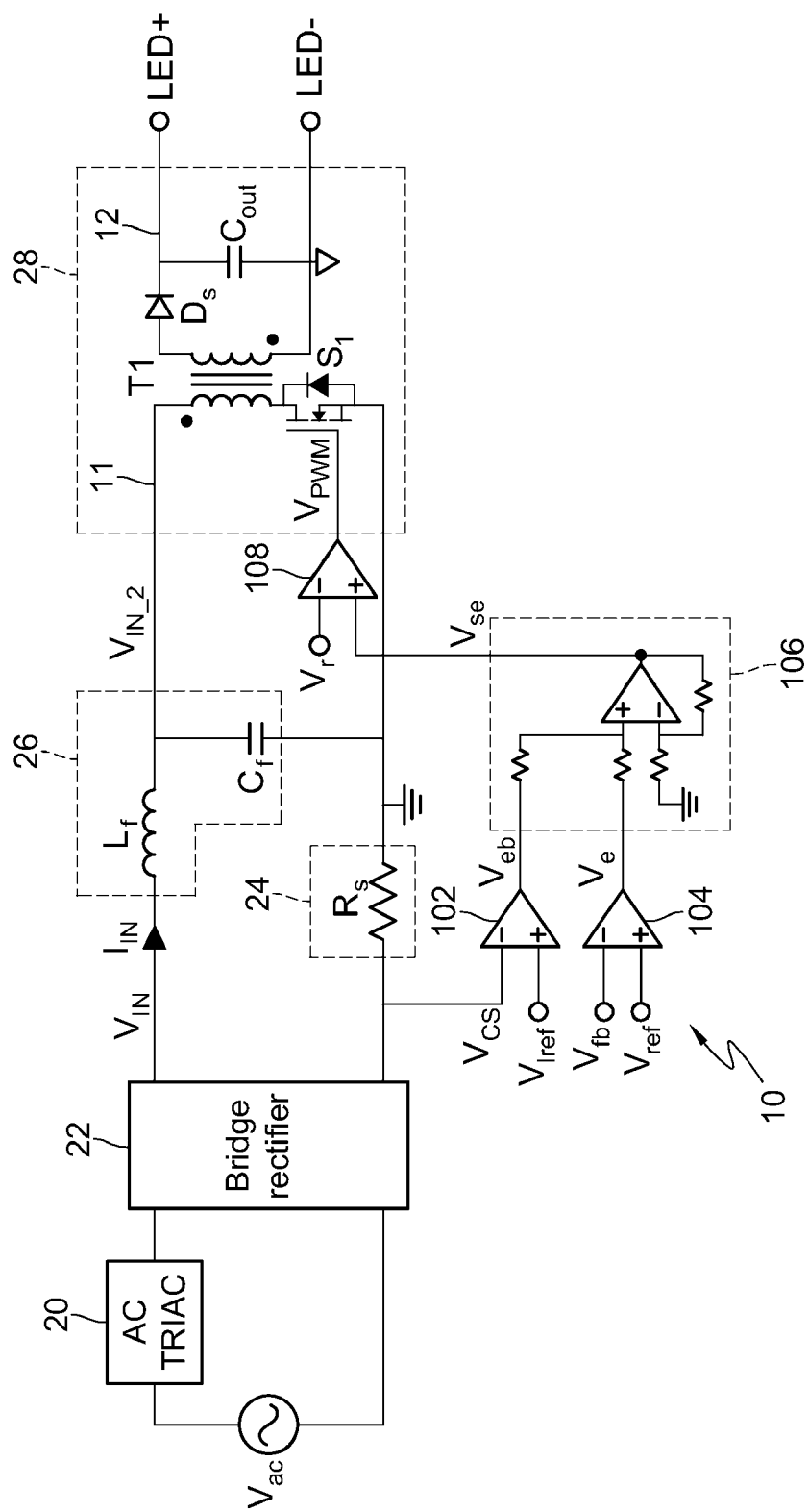
FIG. 4 is a detailed schematic circuit diagram of FIG. 3.

FIG. 3 is a circuit block diagram of an adaptive bleeder circuit applied in a power converter according to an embodiment of the present disclosure, and FIG. 4 is a detailed schematic circuit diagram of FIG. 3. The adaptive bleeder circuit of the present disclosure may also be applied to a power converter not limited to a flyback converter. In other embodiments of the present disclosure, as shown in FIGS. 16 to 21, the adaptive bleeder circuit of the present disclosure may also be applied to a forward converter, a half-bridge converter, a full-bridge converter, or a push-pull converter.

A power converter 28 comprises a transformer T1, a transformer primary side 11, a transformer secondary side 12, a switch element $S_1$, a diode $D_s$, and an output capacitor $C_{out}$. The transformer primary side 11 has a voltage $V_{IN-2}$, in which the voltage $V_{IN-2}$ is obtained by filtering an input voltage $V_{IN}$ through a low pass filter 26, and the input voltage $V_{IN}$ is output by rectifying an AC signal source $V_{ac}$ through an AC TRIAC 20 and a bridge rectifier 22. The transformer secondary side 12 has a plurality of series-connected light emitting diodes 14, and the power converter 28 drives the light emitting diodes 14 to emit light through the input voltage $V_{IN}$ after rectification and voltage transformation. An input current $I_{IN}$ flowing through the AC TRIAC 20 needs to be greater than a holding current $I_H$ in order to enable the AC TRIAC 20 to work normally.

The bleeder circuit 10 is used for outputting a pulse-width-modulated signal $V_{PWM}$, so that the pulse-width-modulated signal $V_{PWM}$ enables the input voltage $V_{in}$ of the power converter 28 to be selectively input or not input to the transformer primary side 11 by controlling on and off state of the switch element $S_1$. The bleeder circuit 10 may dynamically adjust a switch on/off ratio (or referred to as duty ratio) of the pulse-width-modulated signal $V_{PWM}$ according to the holding current $I_H$ and the input current $I_{IN}$ of the AC TRIAC 20, such that when the input current $I_{IN}$ approaches the holding current $I_H$, the bleeder circuit 10 may enable the input current $I_{IN}$ to be maintained above the holding current $I_H$ by increasing the conduction time of the pulse-width-modulated signal $V_{PWM}$, so as to maintain normal operation of the AC TRIAC 20.

Figure 5:
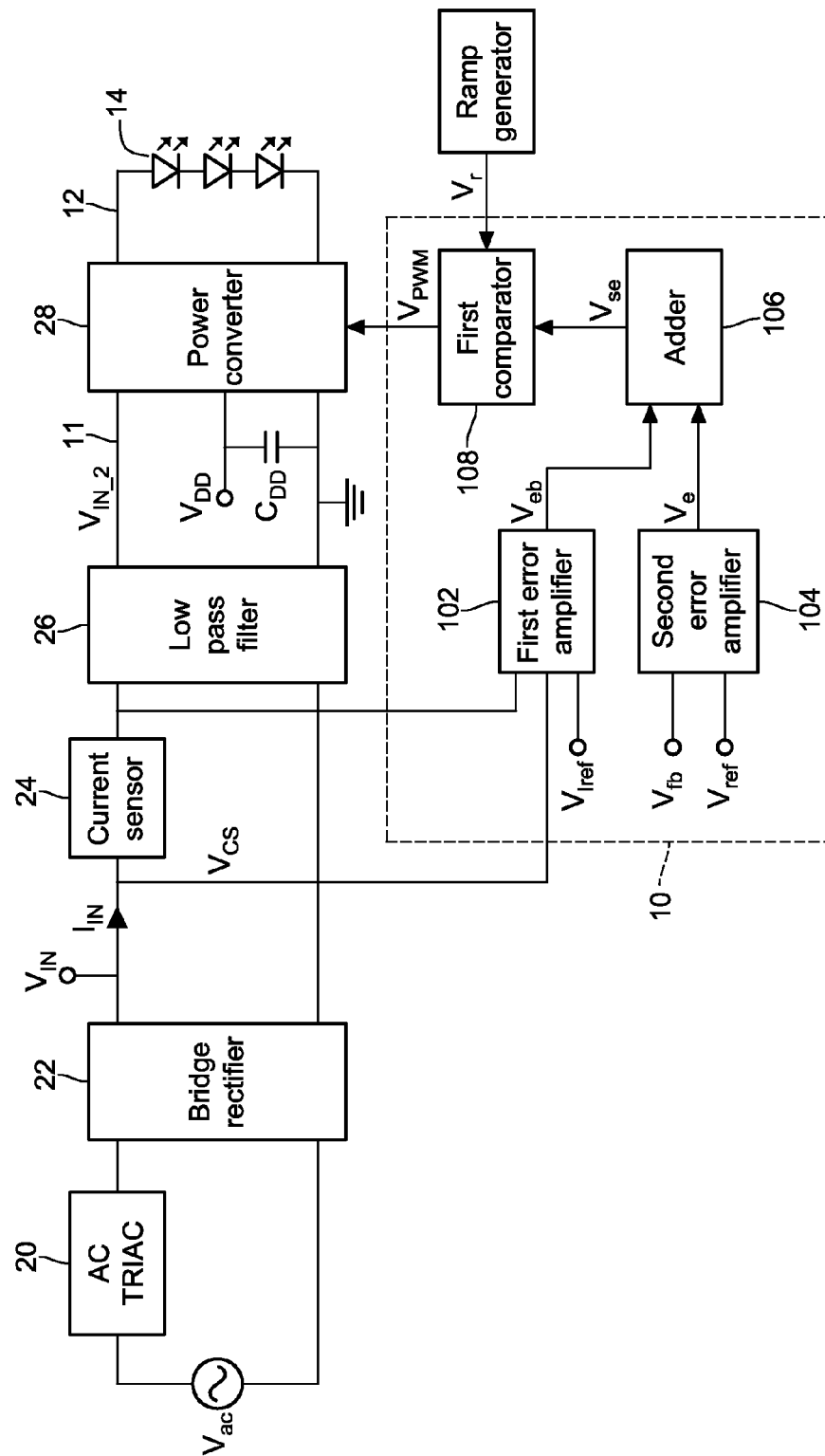
FIG. 5 is a circuit block diagram when a current sensor of an adaptive bleeder circuit is located at a line end of a transformer primary side according to an embodiment of the present disclosure.

FIGS. 3 and 4 show a current sensor 24 is located at the transformer primary side 11 of the power converter 28, and connected between the ground of the converter 28 and the bridge rectifier 22. According to the embodiment of the present disclosure, the current sensor 24 detects the input current $I_{IN}$ of the converter 28 and then outputs a current signal $V_{cs}$. according to resistance of a current sensing resistor $R_s$. The current sensor 24 is not only limited with resistor $R_S$, but the other type of current sensor also can be applied, as shown in FIG. 4. The scope of the present disclosure is not limited by the connection position of the current sensor 24. For example, as shown in FIG. 5, the current sensor 24 may also be connected at a line and end of the transformer primary side 11 of the power converter 28, which can also achieve the objective of the present disclosure.

Specifically, the bleeder circuit 10 comprises a first error amplifier 102, a second error amplifier 104, an adder 106, and a first comparator 108. The first error amplifier 102 outputs a first error signal $V_{eb}$ according to the current detection signal $V_{cs}$ and a reference current signal $V_{Iref}$. The second error amplifier 104 outputs a second error signal $V_e$ according to a sensed signal $V_{fb}$ fed back by the power converter 28 and a reference voltage signal $V_{ref}$.

Figure 6A:
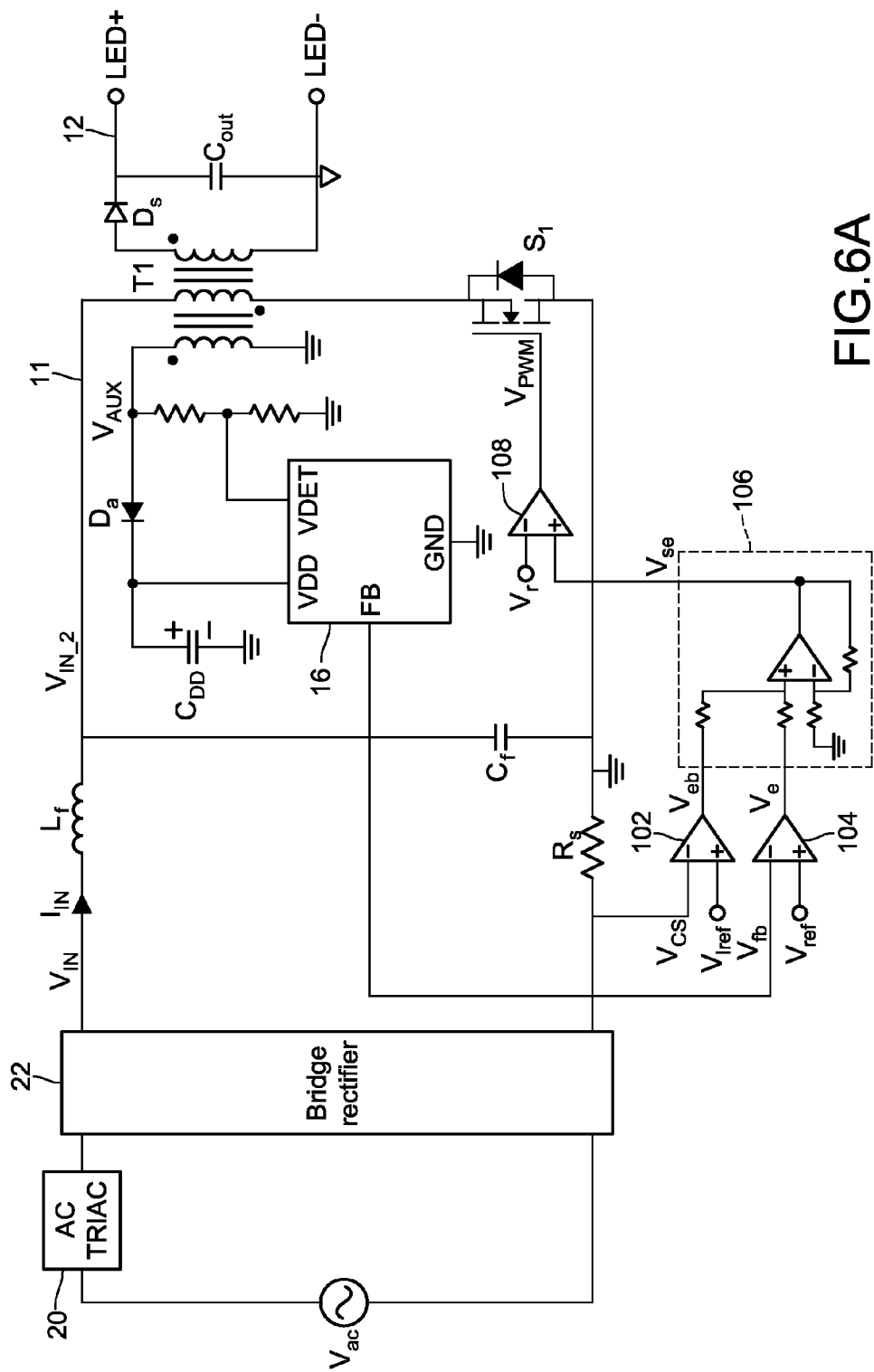
FIG. 6A is a schematic circuit diagram of primary side feedback in a voltage mode control when an adaptive bleeder circuit is applied in a Primary Side Regulator (PSR) of a transformer primary side according to an embodiment of the present disclosure.
Figure 6B:
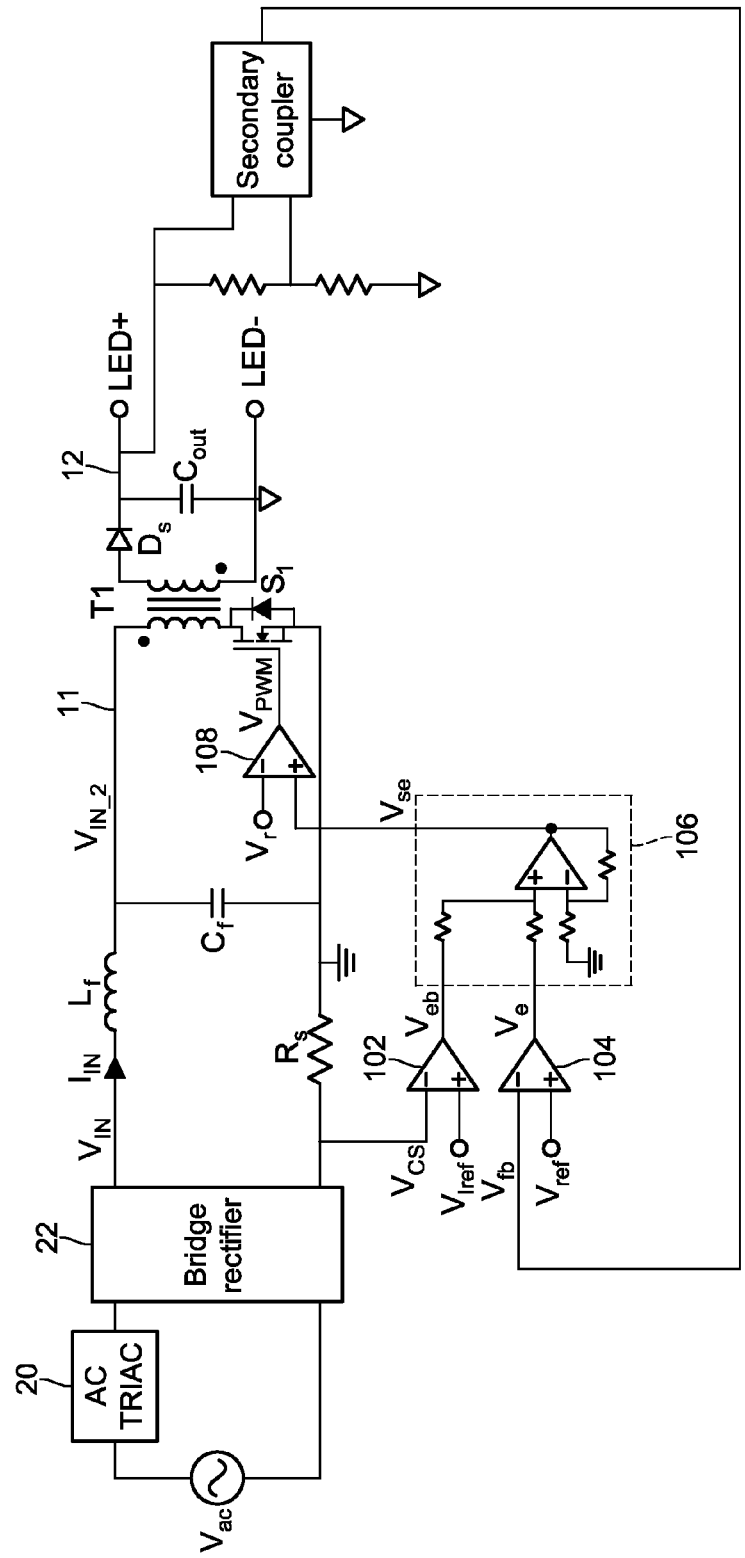
FIG. 6B is a schematic circuit diagram of secondary side feedback in a voltage mode control when an adaptive bleeder circuit is applied in a Secondary Side Regulator (SSR) of a transformer secondary side according to an embodiment of the present disclosure.
Figure 6C:
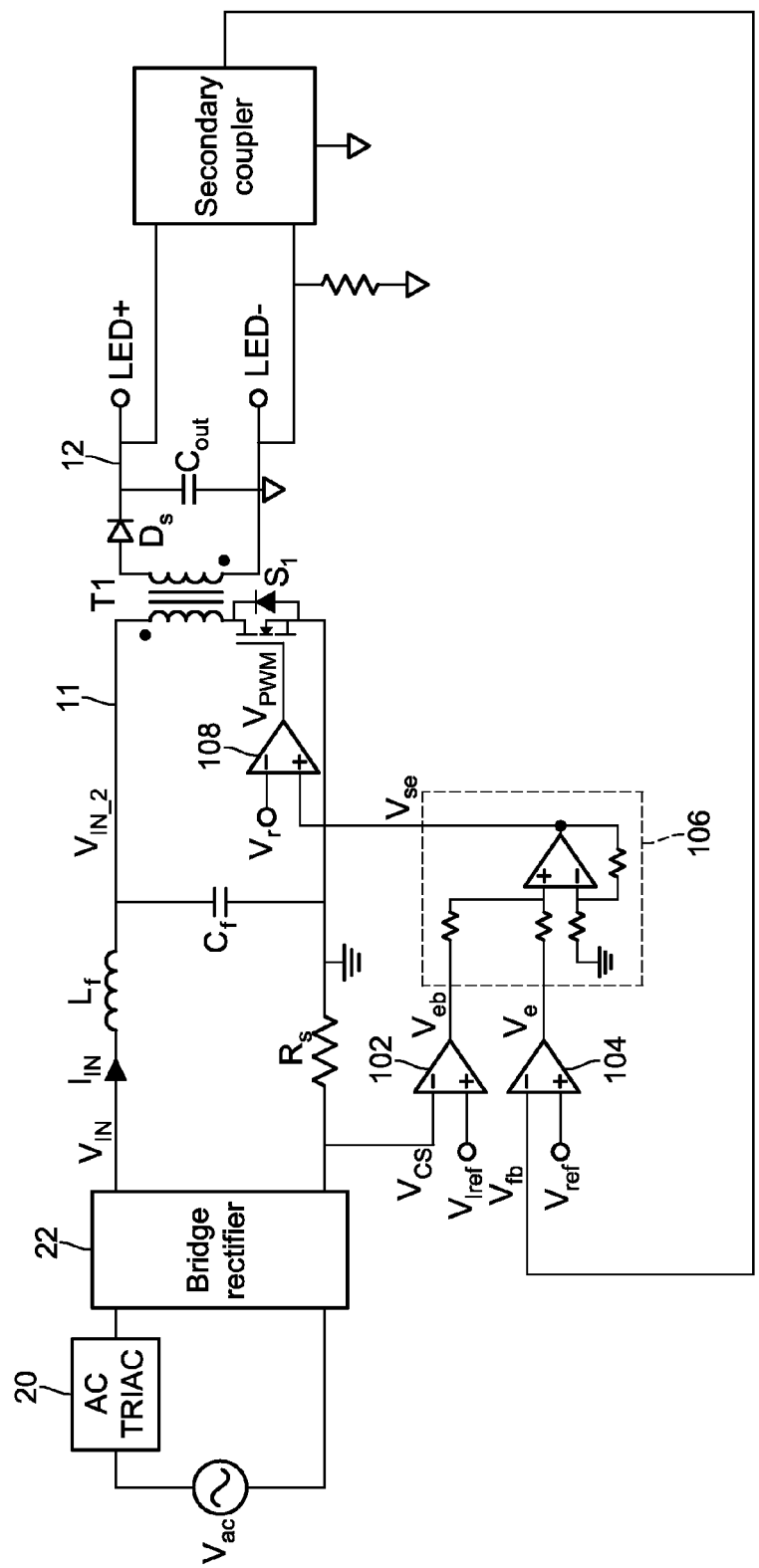
FIG. 6C is a schematic circuit diagram of secondary side feedback in a current mode control when an adaptive bleeder circuit is applied in an SSR of a transformer secondary side according to an embodiment of the present disclosure.

The sensed signal $V_{fb}$ can be obtained through primary side feedback in a voltage mode control of a Primary Side Regulator (PSR) 16 of the transformer primary side 11 as shown in FIG. 6A, or through secondary side feedback in a voltage mode control of a Secondary Side Regulator (SSR) of the transformer secondary side 12 as shown in FIG. 6B, or through secondary side feedback in a current mode control of an SSR as shown in FIG. 6C. In FIG. 6A, a reflected voltage $V_{AUX}$ may charge a capacitor $C_{DD}$ through a diode $D_a$, and provide energy for the PSR 16.

The adder 106 is connected to the first error amplifier 102 and the second error amplifier 104, and outputs a primary control signal $V_{se}$ by adding the first error signal $V_{eb}$ and the second error signal $V_e$. Later, the first comparator 108 receives the primary control signal $V_{se}$, compares the primary control signal $V_{se}$ with the ramp signal $V_r$, and outputs the pulse-width-modulated signal $V_{PWM}$.

The current detection signal $V_{cs}$ of the transformer primary side 11 is proportional to the input current $I_{IN}$ flowing through the AC TRIAC 20 Therefore, when the reference current signal $V_{Iref}$ is configured correspondingly to the holding current $I_H$ of the AC TRIAC 20, the first error amplifier 102 and the second error amplifier 104 are dynamically reflecting the input current characteristics of the power converter 28 and the AC TRIAC 20. The duty ratio of the pulse-width-modulated signal $V_{PWM}$ is dynamically changed with the input current $I_{IN}$ of the AC TRIAC 20 and the holding current $I_H$, so as to maintain normal operation of the AC TRIAC 20.

FIGS. 7A to 7G show the waveforms of the converter and adaptive bleeder. FIGS. 7A 7B and 7D show the current waveform of the converter with adaptive bleeder. In FIG. 7A, the adaptive bleeder works in time periods A and B. The input current waveform of the converter and control signal of the adaptive bleeder in the time period A and B are shown in FIGS. 7B to 7D and FIGS. 7E to 7G, respectively. In the time period A of FIG. 7A, when the input current $I_{IN}$ of the converter approaches to the holding current $I_H$ of the TRIAC, the switch element of the bleeder is turned on by $V_{PWM}$. Therefore, the input current of the converter is increased to holding current $I_H$ due to adaptive bleeder in order to maintain TRIAC normal operation, as shown in FIGS. 7B.

In the time period B of FIG. 7A, $I_{IN}$ increases gradually but is still maintained to be lower than the holding current $I_H$, the first error signal $V_{eb}$ amplified by the first error amplifier 102 decreases slowly, and then is compared with the ramp signal $V_r$, such that the duty ratio of the pulse-width-modulated signal $V_{PWM}$ is decreased gradually. Therefore, as shown in time period B of FIG. 7A, the current extracted by the bleeder circuit 10 compensates an amount by which the input current $I_{IN}$ fails to reach the holding current $I_H$, and the conduction time of the pulse-width-modulated signal $V_{PWM}$ does not decrease to zero until the input current $I_{IN}$ completely recovers to the holding current $I_H$, ceasing the bleeder circuit 10 from working.

Figure 8:
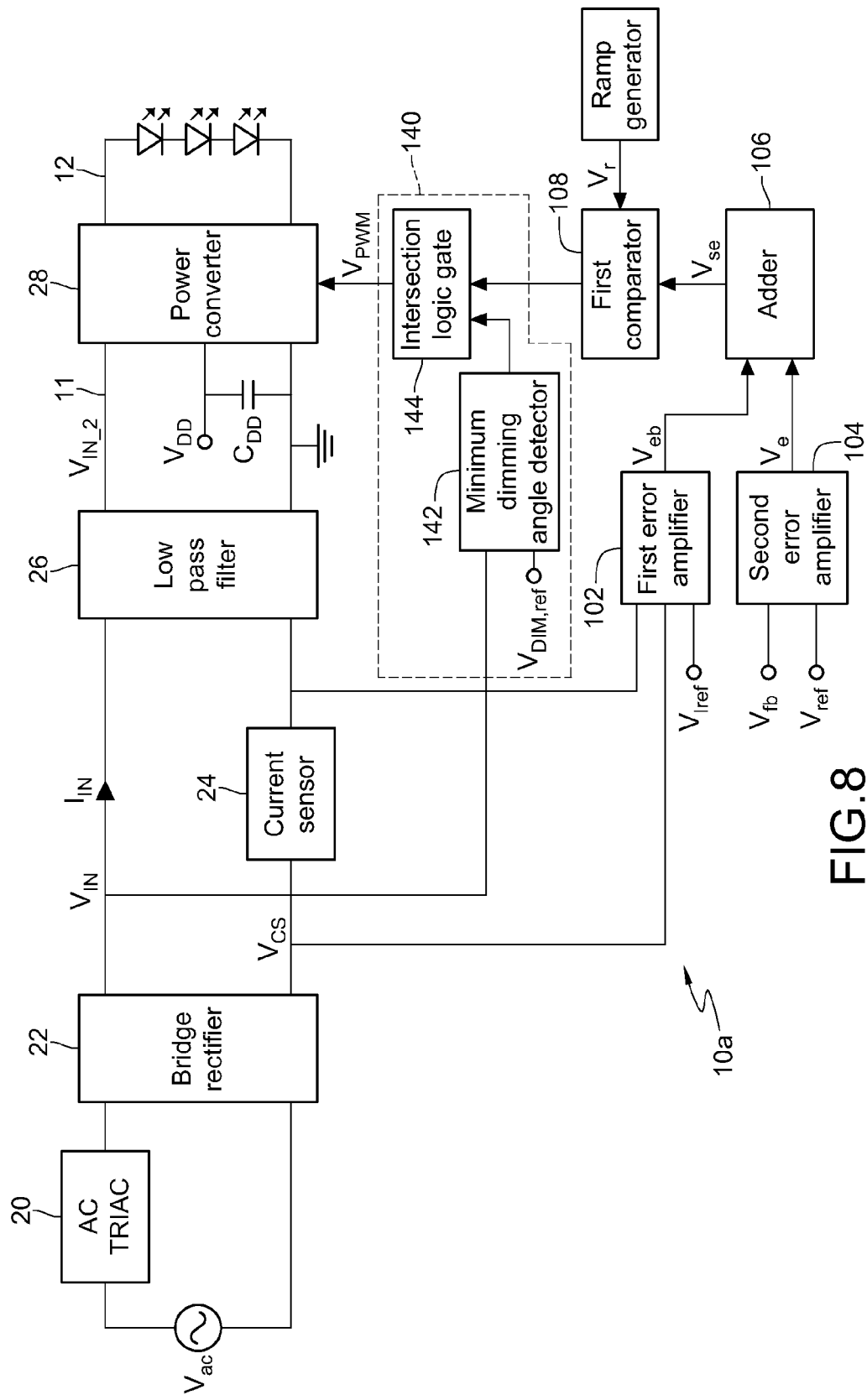
FIG. 8 is a circuit block diagram of an adaptive bleeder circuit applied in a power converter according to a second embodiment of the present disclosure.

FIG. 8 shows the circuit block diagram of the adaptive bleeder circuit is applied in the power converter according to a second embodiment of the present disclosure. A bleeder circuit 10a comprises a first error amplifier 102, a second error amplifier 104, an adder 106, a first comparator 108, and a dimming angle detection circuit 140. The dimming angle detection circuit 140 is connected between a power converter 28 and the first comparator 108, and comprises a minimum dimming angle detection circuit 142 and an AND gate 144. Two input ends of the minimum dimming angle detector 142 respectively receive an output voltage $V_{in}$ and a minimum dimming reference signal $V_{DIM,ref}$, and an output end of the minimum dimming angle detector 142 is connected to the AND gate 144. Therefore, according to the bleeder circuit 10a of the second embodiment of the present disclosure, when the dimming angle of the input voltage $V_{in}$ is too low and the voltage signal is less than the minimum dimming reference signal $V_{DIM,ref}$, the AND gate 144 does not output a pulse-width-modulated signal $V_{PWM}$, so as to prevent the power converter 28 from working abnormally due to too low input voltage $V_{in}$, or a light emitting diode 14 at a load end from flickering due to unstable angle signals caused by too low dimming angle.

Figure 9A:
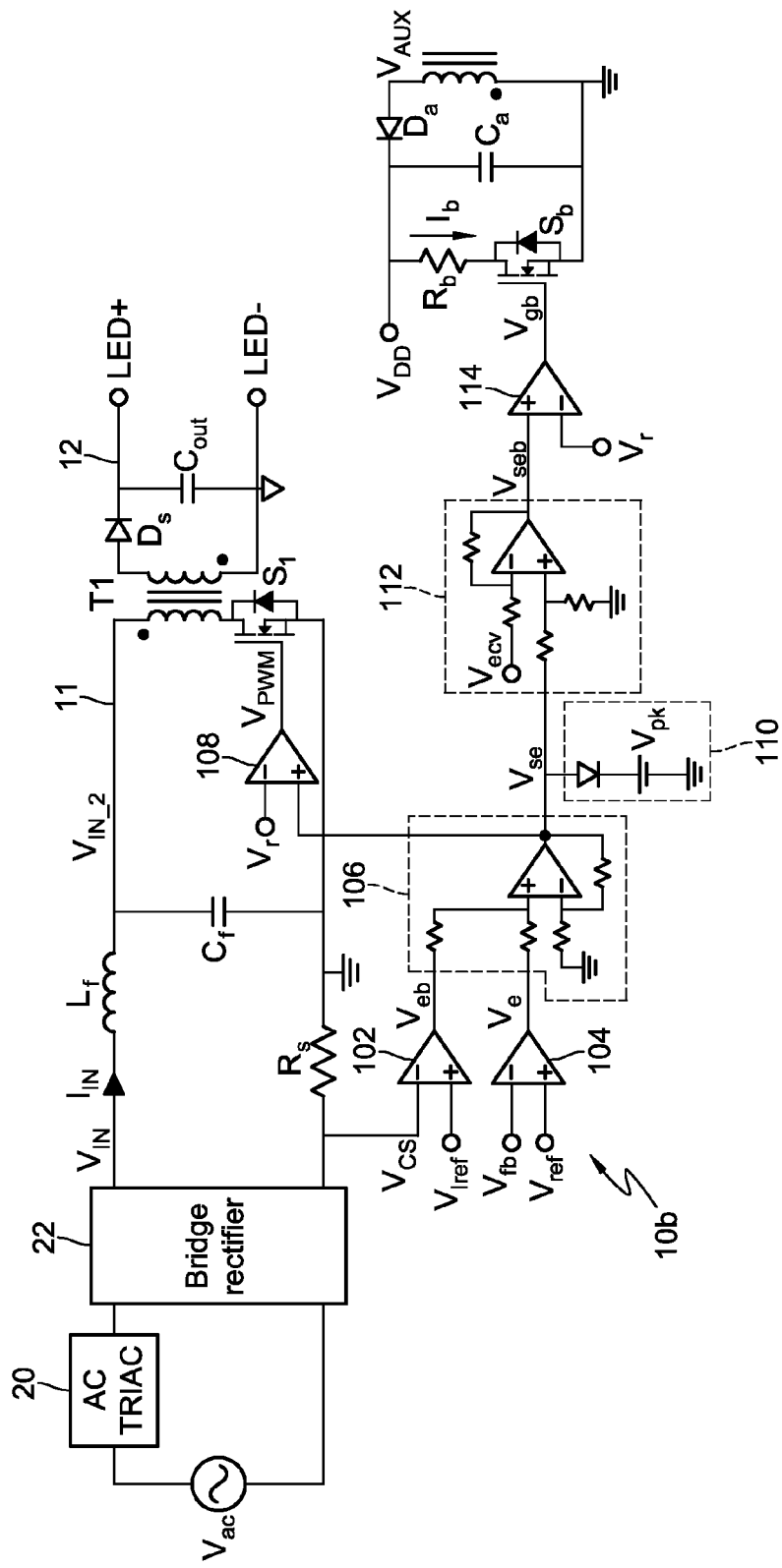
FIGS. 9A and 9B are detailed schematic circuit diagrams of an adaptive bleeder circuit according to a third embodiment of the present disclosure.
Figure 9B:
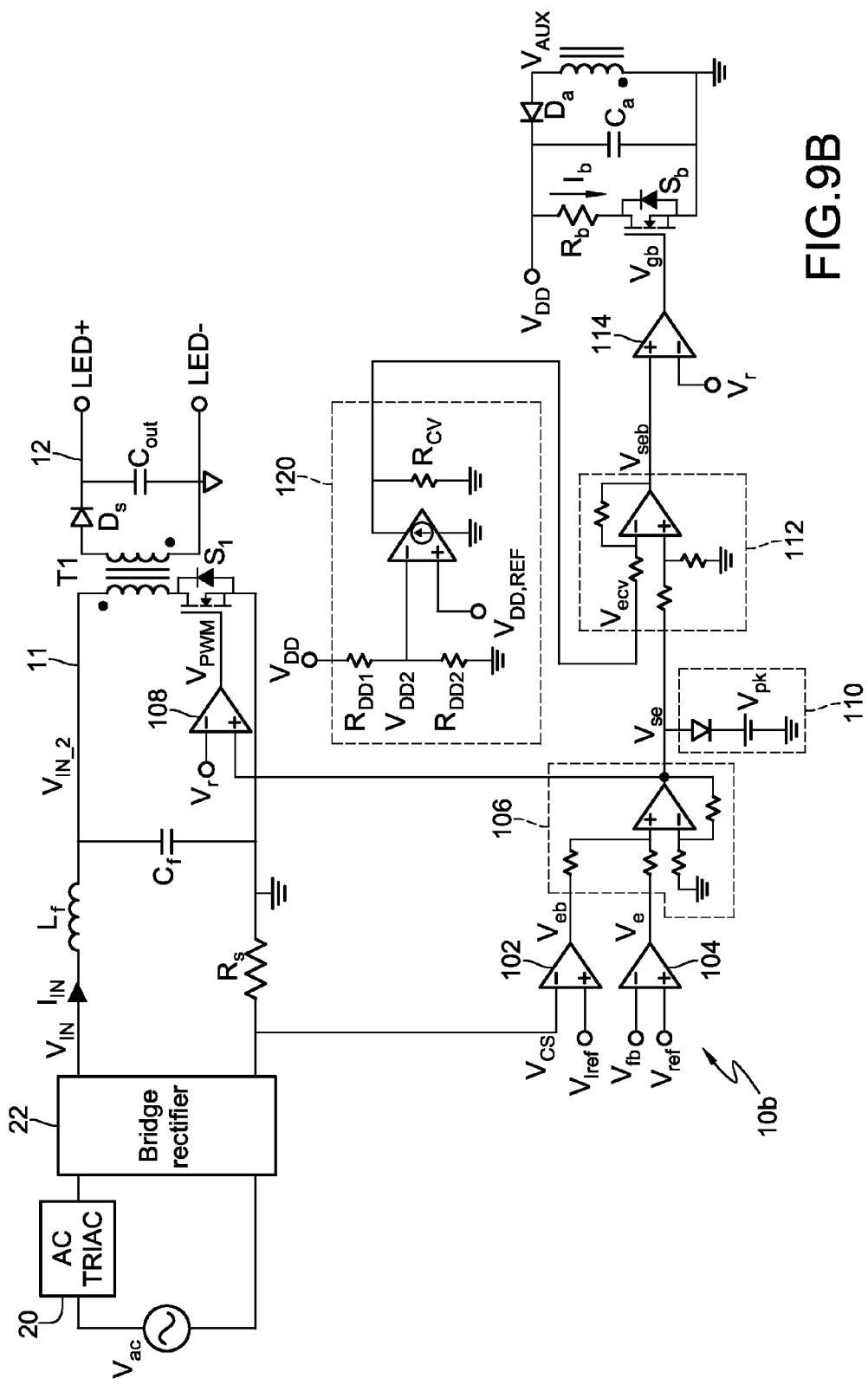

In addition, in order to ensure that input power increased due to the increase of the input current $I_{IN}$ does not affect the load of the power converter 28, FIGS. 9A and 9B show the detailed schematic circuit diagrams of an adaptive bleeder circuit according to a third embodiment of the present disclosure. According to the third embodiment of the present disclosure, a bleeder circuit 10b comprises a first error amplifier 102, a second error amplifier 104, an adder 106, and a first comparator 108, and further comprises an auxiliary bleeder circuit. The auxiliary bleeder circuit can be configured at a primary side or an auxiliary side of the power converter 28. The auxiliary bleeder circuit comprises an amplitude limiter 110, a subtractor 112, and a second comparator 114. The auxiliary bleeder circuit is mainly used for outputting a switching signal $V_{gb}$, and determining an average current (that is, a bleeder current $I_b$) flowing through a bleeder resistor $R_b$ by controlling the switch on/off ratio (or referred to as duty ratio) of the switching signal $V_{gb}$, so as to consume redundant power generated by the power converter 28 when the input current $I_{IN}$ recovers to holding current $I_H$ of TRIAC.

Specifically, the amplitude limiter 110 is connected to the adder 106, and limits an upper limit value (or referred to as upper limit voltage) of a primary control signal $V_{se}$ through an amplitude signal $V_{pk}$. The subtractor 112 is connected to the amplitude limiter 110, and outputs a secondary control signal $V_{seb}$ according to the primary control signal $V_{se}$ after amplitude limitation and a constant voltage signal (or called as voltage stabilizing signal) $V_{ecv}$. The second comparator 114 receives the secondary control signal $V_{seb}$, compares the secondary control signal $V_{seb}$ with a ramp signal $V_r$, and then outputs the switching signal $V_{gb}$. According to the third embodiment of the present disclosure, the bleeder circuit 10b may control the conduction time of the switch element $S_b$ through high and low levels of the switching signal $V_{gb}$, such that the bleeder current $I_b$ flowing through the bleeder resistor $R_b$ dynamically consumes the redundant power generated by the power converter 28 when the input current $I_{IN}$ increases.

Furthermore, as shown in FIG. 9B, the subtractor 112 may be connected to a constant voltage controller (or call as voltage stabilizing controller) 120 The constant voltage controller 120 is used for generating the constant voltage signal $V_{ecv}$, and performing negative feedback on the switching signal $V_{gb}$ of the switch element $S_b$. Specifically, when the duty ratio of the switching signal $V_{gb}$ is too great (that is, the auxiliary bleeder circuit consumes too much power of the power converter 28), a auxiliary side voltage $V_{DD}$ for connecting the bleeder circuit 10b decreases. In order to avoid turning off the whole controller due to too low point potential $V_{DD}$, the constant voltage controller 120 is applied. According to a voltage signal $V_{DD2}$ obtained by dividing the auxiliary side voltage (or called as point potential) $V_{DD}$ through voltage-dividing resistors $R_{DD1}$ and $R_{DD2}$ and a minimum rated point voltage $V_{DD,REF}$, that the auxiliary side voltage $V_{DD}$ only outputs the constant voltage signal $V_{ecv}$ when the voltage is greater than the minimum rated point voltage $V_{DD,REF}$. As such, the constant voltage controller 120 may be used for providing the constant voltage signal $V_{ecv}$ as a negative feedback of the switching signal $V_{gb}$, so as to reduce the conduction time of the switch element $S_b$, and ensure that the power consumed by the bleeder resistor $R_b$ is not more than the redundant power introduced as the input current $I_{IN}$ recovers to the holding current $I_H$, thereby maintaining a stable auxiliary side voltage $V_{DD}$.

Figure 10:
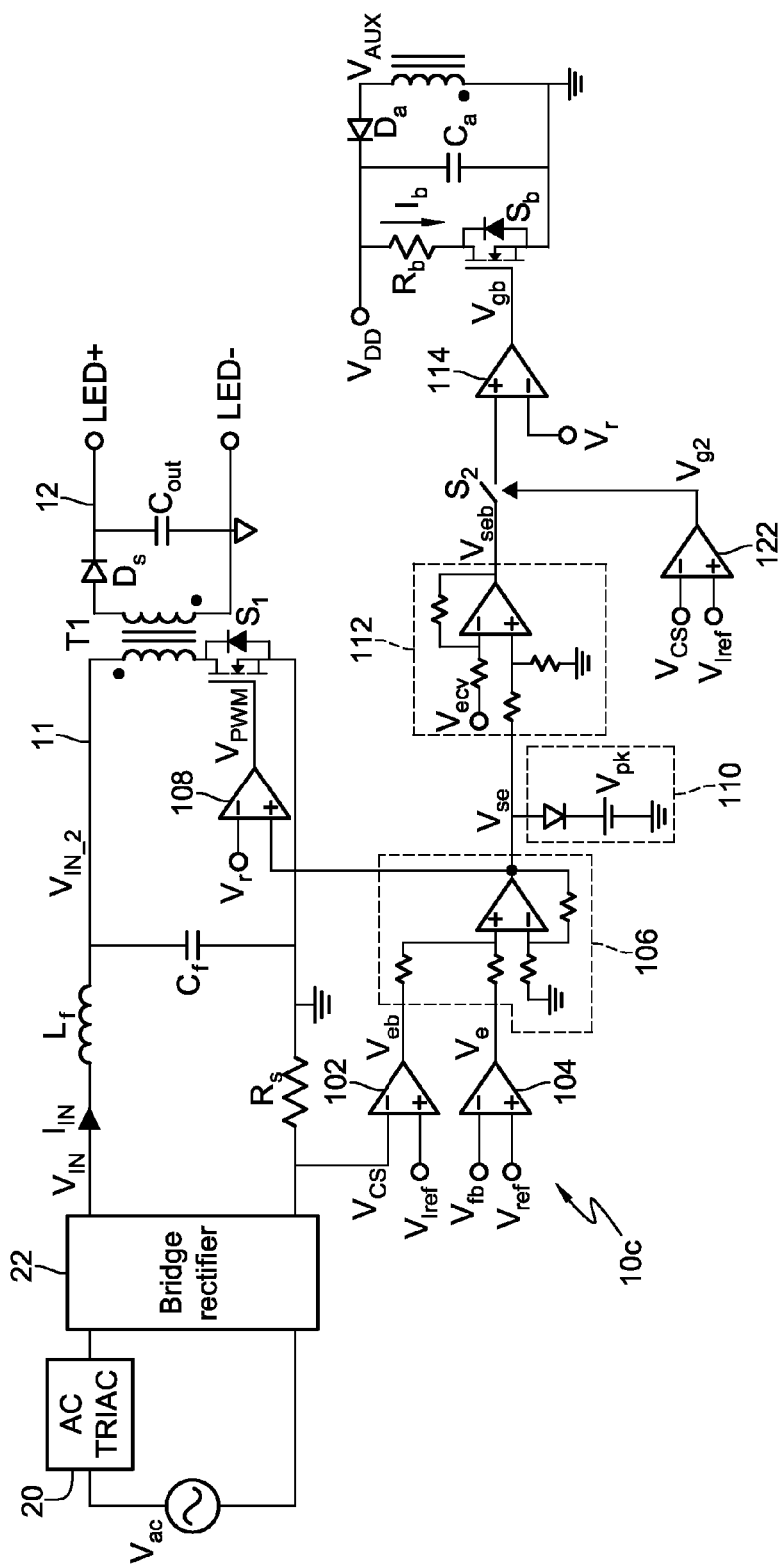
FIG. 10 is a detailed schematic circuit diagram of an adaptive bleeder circuit according to a fourth embodiment of the present disclosure.

FIG. 10 is a detailed schematic circuit diagram of an adaptive bleeder circuit according to a fourth embodiment of the present disclosure; According to the fourth embodiment of the present disclosure, a bleeder circuit 10c comprises a first error amplifier 102, a second amplifier 104, an adder 106, a first comparator 108, an amplitude limiter 110, a subtractor 112, a second comparator 114, a switch element $S_2$, and a third comparator 122. The switch element $S_2$ is connected between the subtractor 112 and the second comparator 114, and a switch signal $V_{g2}$ output by the third comparator 122 is used for controlling on and off states of the switch element $S_2$. Two input ends of the third comparator 122 are respectively connected to a current detection signal $V_{cs}$ and a reference current signal $V_{Iref}$ and as the current detection signal $V_{cs}$ is corresponding to an input current $I_{IN}$ flowing through an AC TRIAC 20, when the input current $I_{IN}$ is greater than a holding current $I_H$ (that is, the current detection signal $V_{cs}$ is less than the reference current signal $V_{Iref}$), the switch element $S_2$ is cut off, so as to protect the adaptive bleeder circuit from working when the input current $I_{IN}$ is greater than holding current $I_H$.

Figure 11:
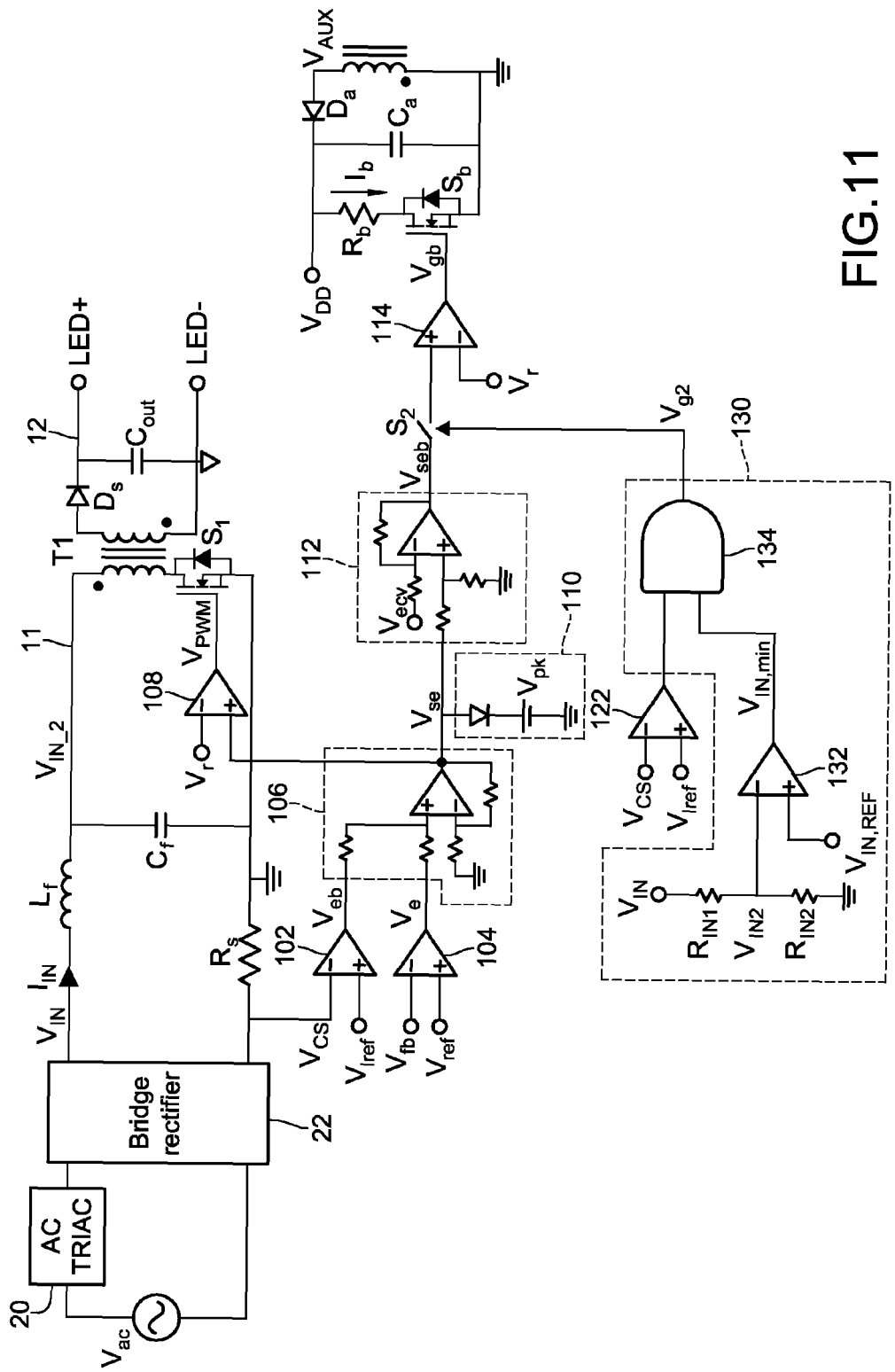
FIG. 11 is a detailed schematic circuit diagram of an adaptive bleeder circuit according to a fifth embodiment of the present disclosure.

FIG. 11 is a detailed schematic circuit diagram of an adaptive bleeder circuit according to a fifth embodiment of the present disclosure. A minimum input voltage detector (or called as voltage limiting circuit) 130 is further connected between a switch element $S_2$ and a third comparator 122. The minimum input voltage detector 130 comprises a comparator 132 and an AND gate 134 serially connected to each other. An input end of the amplifier 132 is connected to a minimum rated input voltage $V_{IN,REF}$, the other end is connected to a voltage signal $V_{IN2}$ obtained by dividing the input voltage signal $V_{IN}$ through voltage-dividing resistors $R_{IN1}$ and $R_{IN2}$. As such, the comparator 132 outputs a minimum input voltage $V_{IN,min}$, two input ends of the AND gate 134 are connected to the minimum input voltage $V_{IN,min}$ and an output end of the third comparator 122, in order to turn off the switch element $S_2$ when the input voltage $V_{IN}$ of the power converter 28 is less than the minimum rated input voltage $V_{IN,REF}$. When the switch element S2 is turned off, the minimum input voltage detector 130 stops the switch signal being output, i.e. the minimum input voltage detector 130 stops the adaptive bleeder circuit working. Thereby, the minimal input voltage detector ensuring that the adaptive bleeder circuit does not work when the input voltage $V_{IN}$ is too low.

Figure 12:
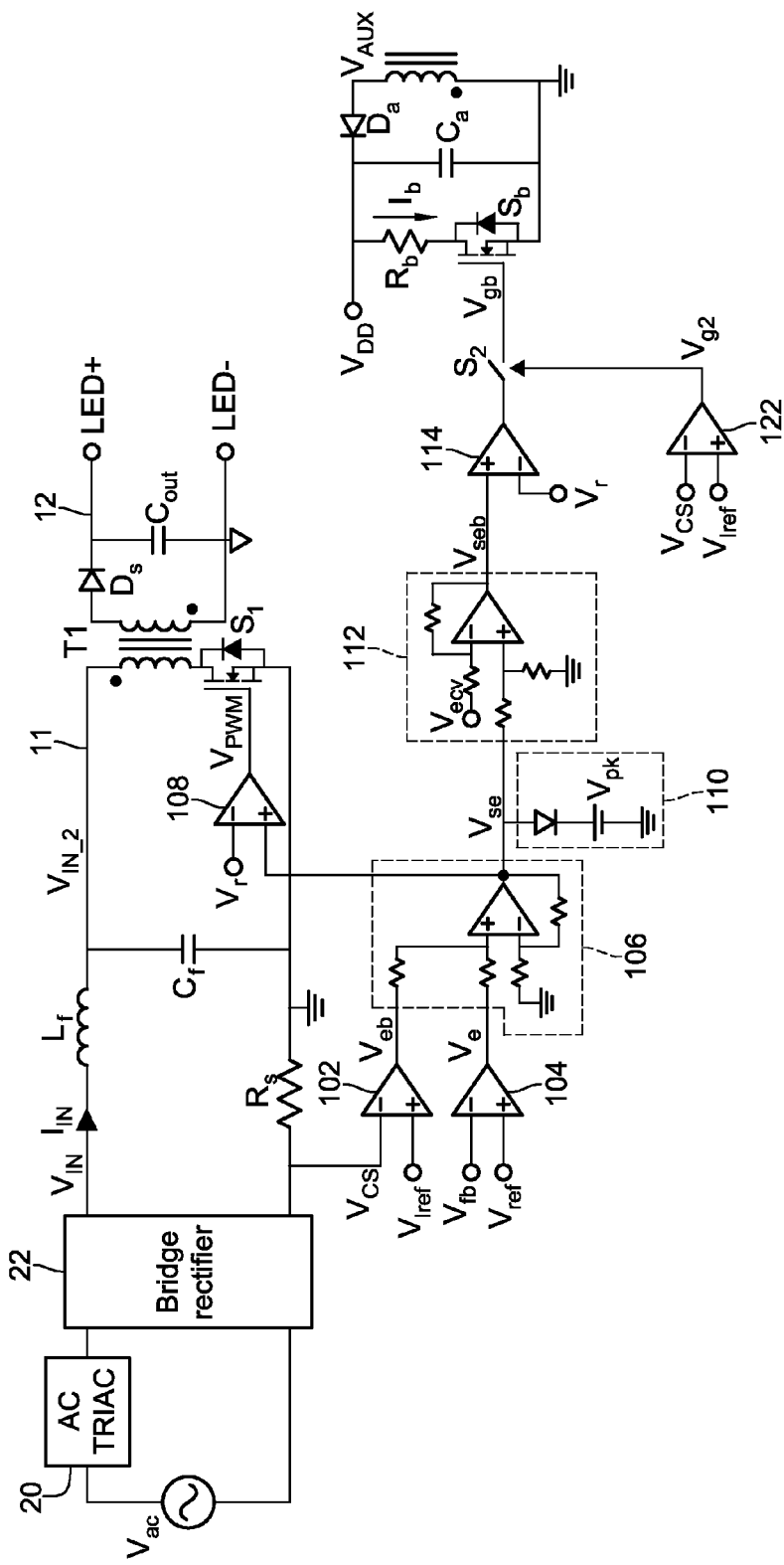
FIG. 12 is a detailed schematic circuit diagram of an adaptive bleeder circuit according to a sixth embodiment of the present disclosure.
Figure 13:
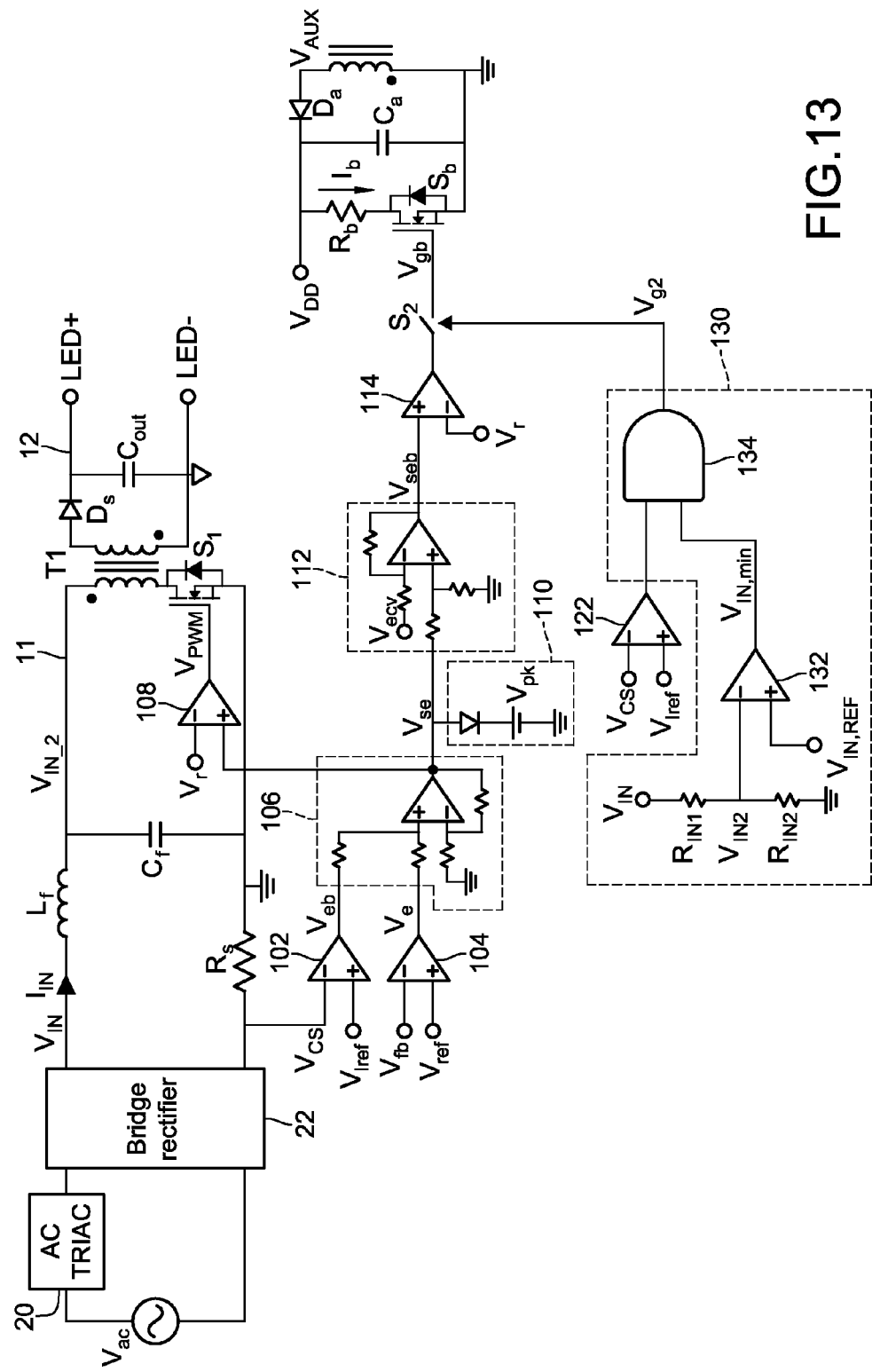
FIG. 13 is a detailed schematic circuit diagram of an adaptive bleeder circuit according to a seventh embodiment of the present disclosure.

In addition, according to the adaptive bleeder circuit of the present disclosure, the scope of the present disclosure is not limited by the connection positions of the switch element $S_2$, the third comparator 122 connected to the switch element $S_2$, and the minimal input voltage detector 130 in the whole circuit. Designers should determine the configuration position corresponding to each circuit according to the technical content shown in the present disclosure, which falls within the scope of the present disclosure. For example, FIGS. 12 and 13 show the detailed schematic circuit diagrams of an adaptive bleeder circuit according to a sixth embodiment and a seventh embodiment of the present disclosure, respectively. in which the switch element $S_2$, the third comparator 122 connected to the switch element $S_2$, and the minimum input voltage detector 130 may also be selectively configured at an output end of a second comparator 114, so as to achieve the effect that the adaptive bleeder circuit of the present disclosure does not work when the input current $I_{IN}$ is greater than the holding current $I_H$ and the input voltage $V_{IN}$ is less than the minimum rated input voltage $V_{IN,REF}$.

Figure 14:
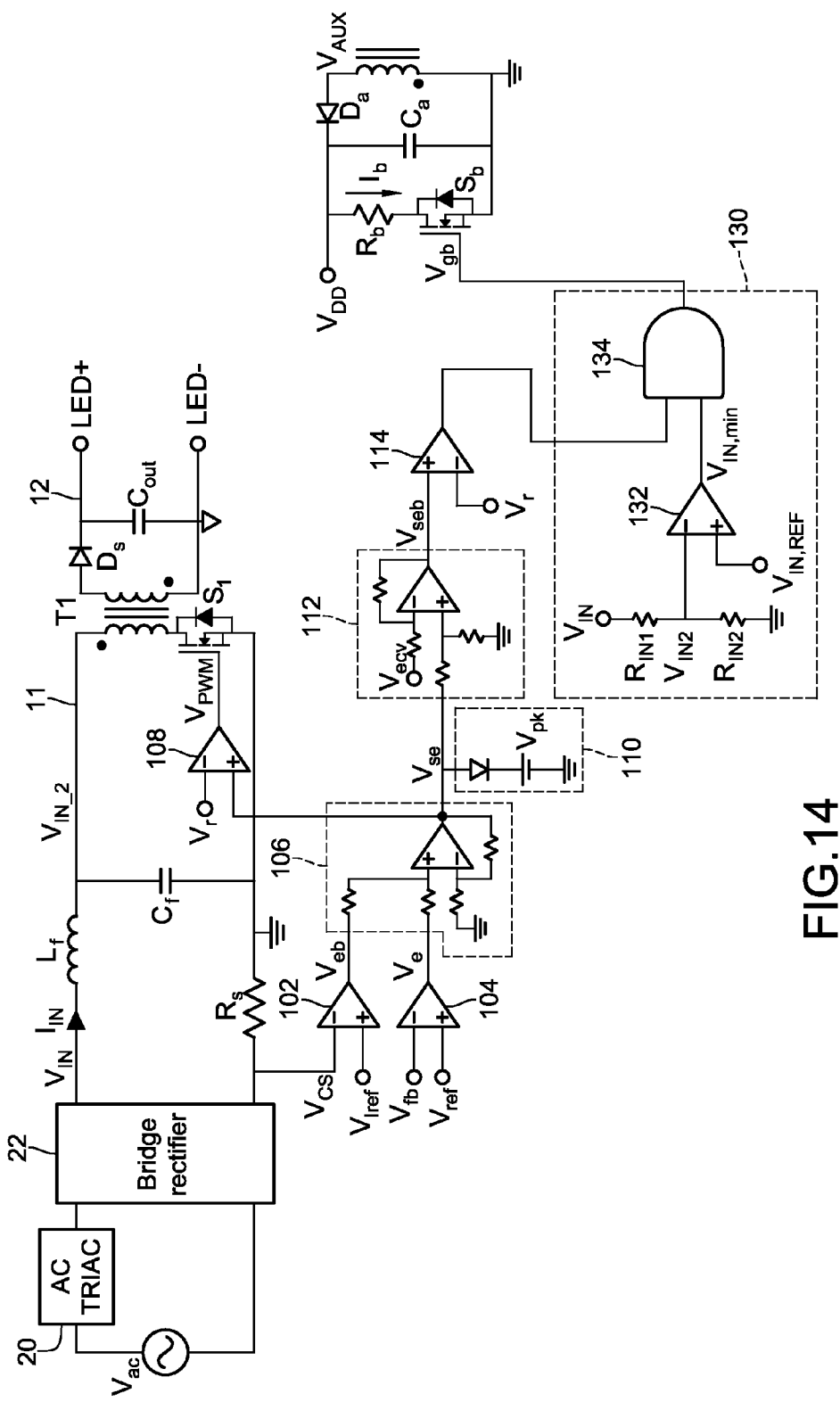
FIG. 14 is a detailed schematic circuit diagram of an adaptive bleeder circuit according to an eighth embodiment of the present disclosure.
Figure 16:
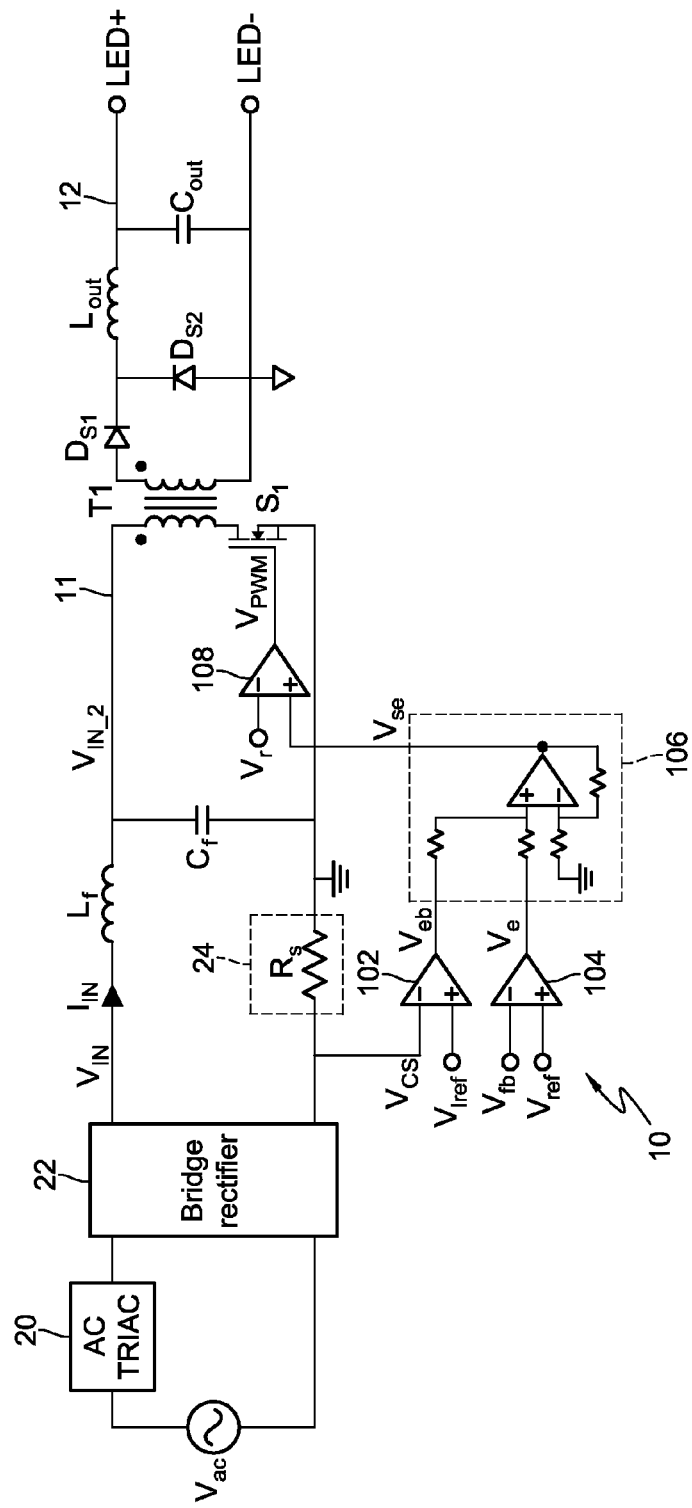
FIG. 16 is a detailed schematic circuit diagram of an adaptive bleeder circuit applied in a forward converter according to an embodiment of the present disclosure.
Figure 17:
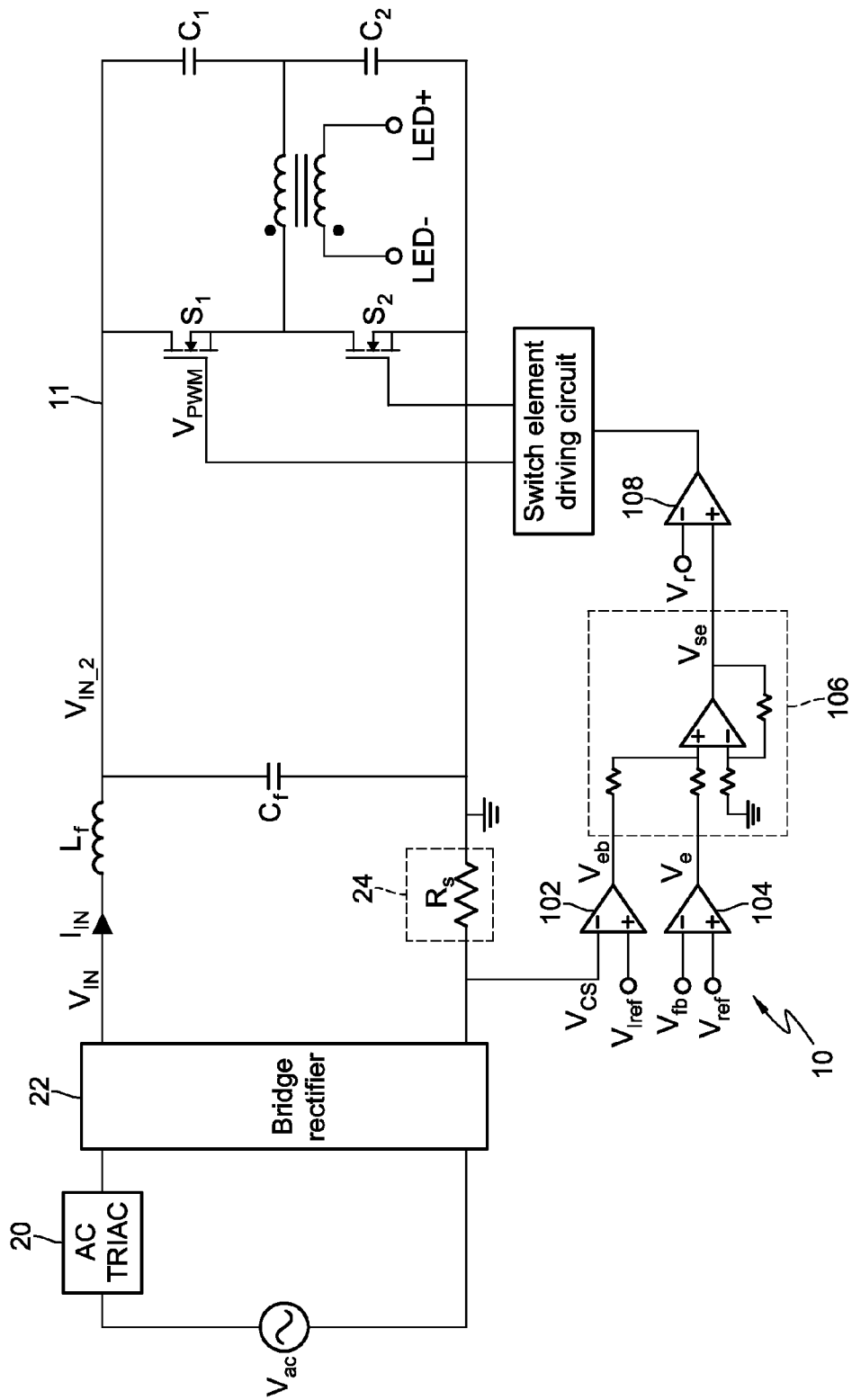
FIG. 17 is a detailed schematic circuit diagram of an adaptive bleeder circuit applied in a half-bridge converter according to an embodiment of the present disclosure.
Figure 18:
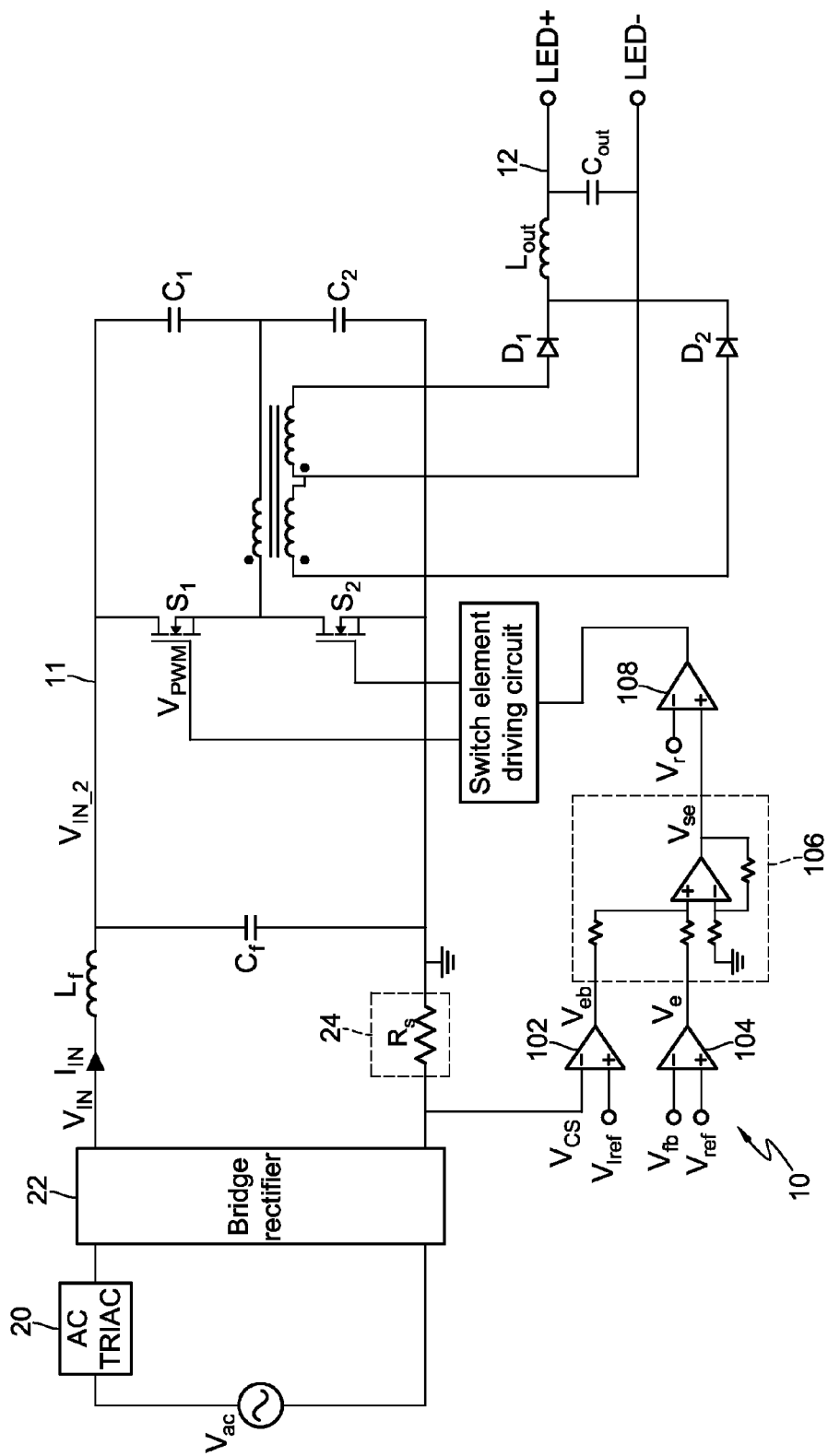
FIG. 18 is a detailed schematic circuit diagram of an adaptive bleeder circuit applied in a half-bridge converter having a center tap according to an embodiment of the present disclosure.
Figure 19:
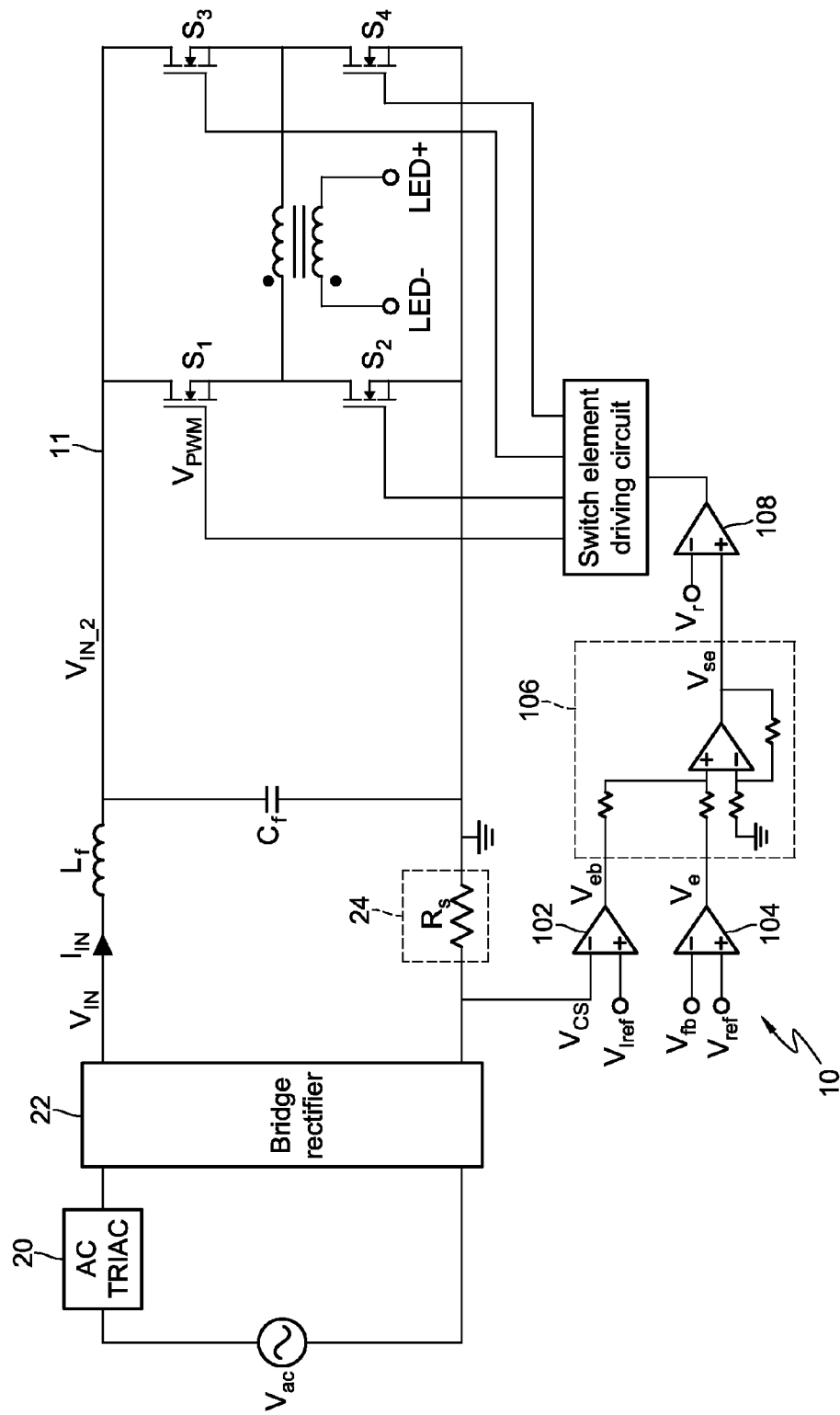
FIG. 19 is a detailed schematic circuit diagram of an adaptive bleeder circuit applied in a full-bridge converter according to an embodiment of the present disclosure.
Figure 20:
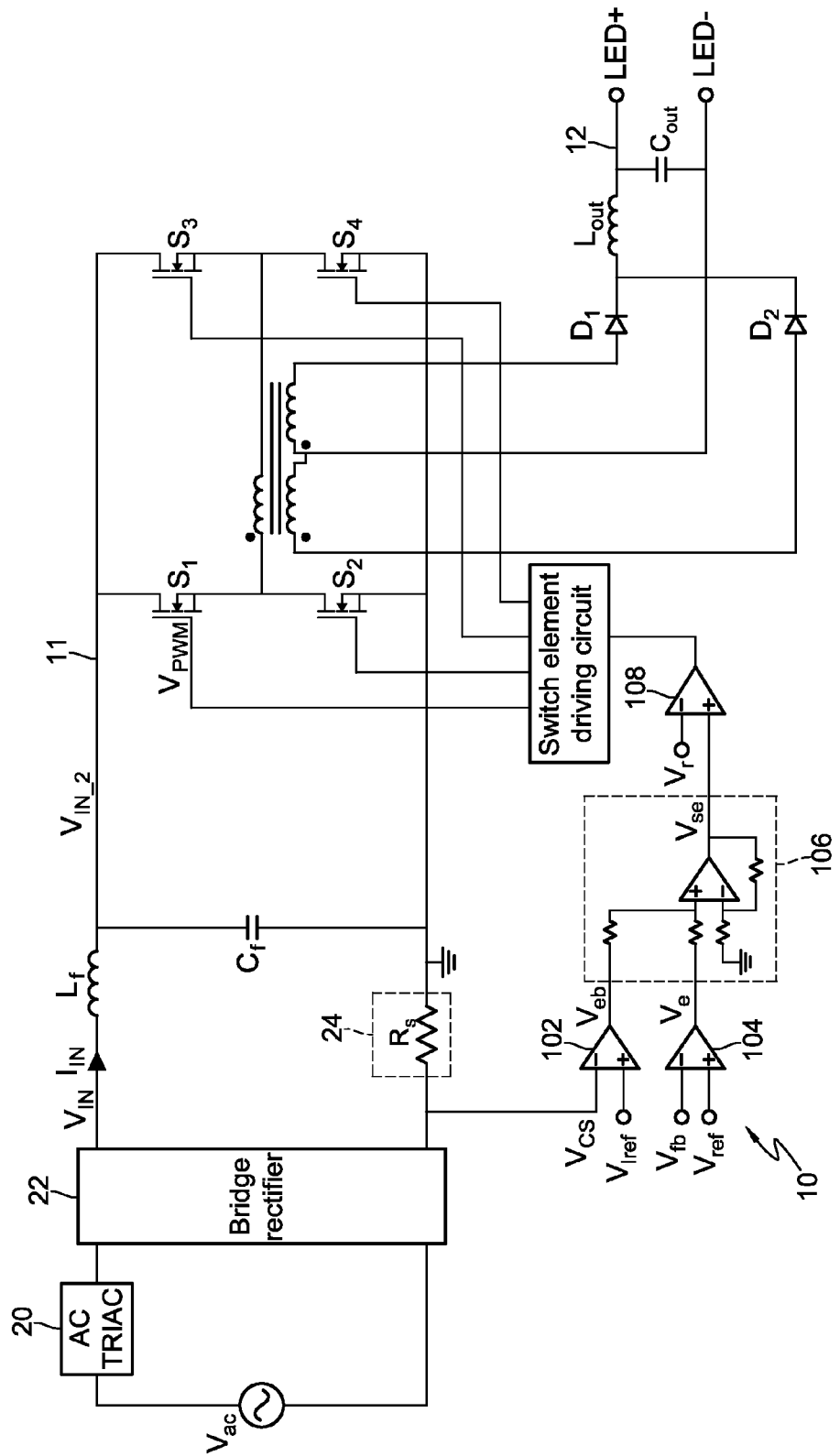
FIG. 20 is a detailed schematic circuit diagram of an adaptive bleeder circuit applied in a full-bridge converter having a center tap according to an embodiment of the present disclosure.
Figure 21:
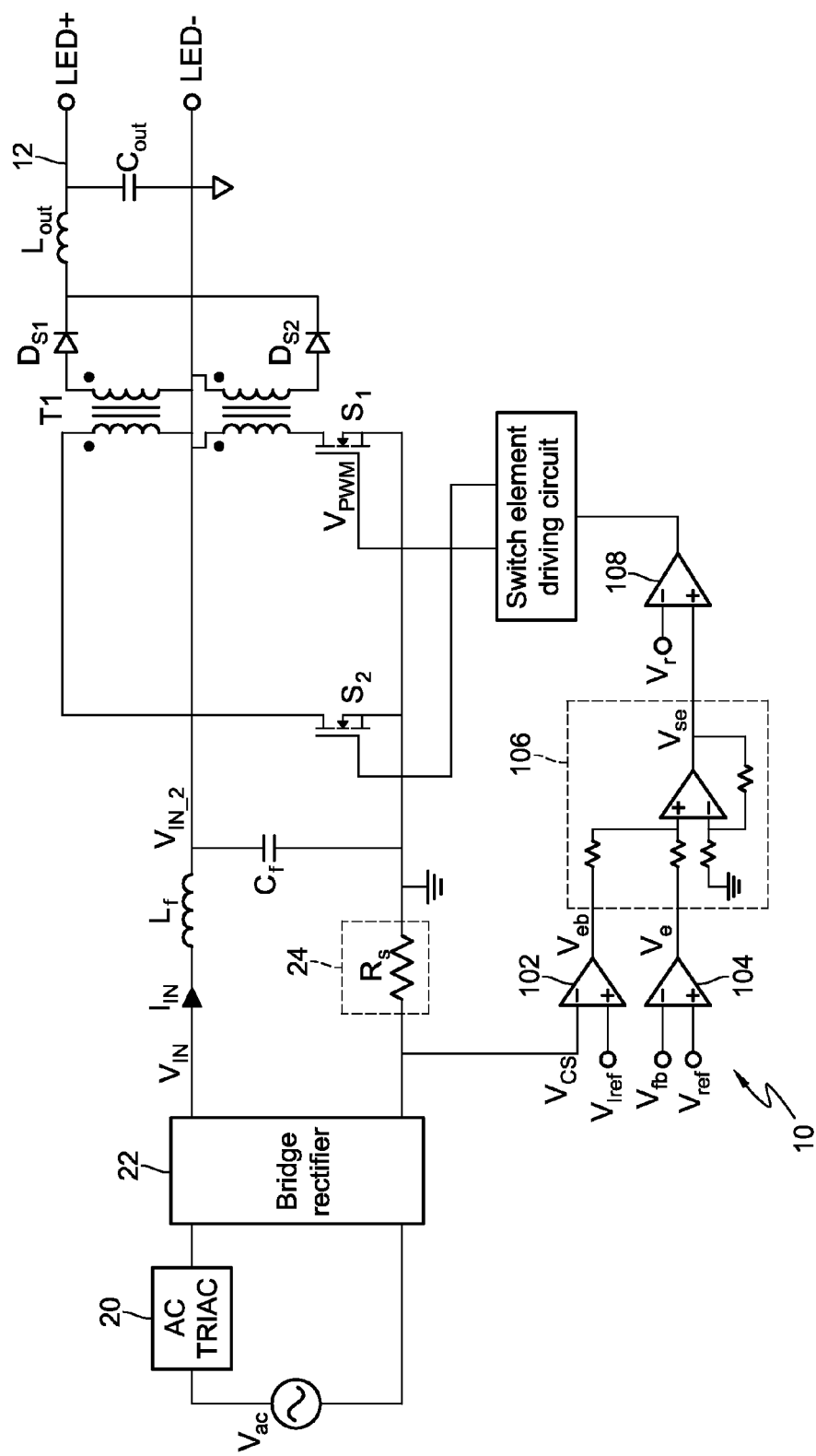
FIG. 21 is a detailed schematic circuit diagram of an adaptive bleeder circuit applied in a push-pull converter according to an embodiment of the present disclosure.

FIG. 14 shows the detailed schematic circuit diagram of an adaptive bleeder circuit according to an eighth embodiment of the present disclosure. The minimum input voltage detector 130 may also be directly connected to the output end of the second comparator 114, so as to cut off the adaptive bleeder circuit when the input voltage $V_{IN}$ is less than the minimum rated input voltage $V_{IN,REF}$.

FIGS. 15A to 15H show the simulated waveform diagrams of an adaptive bleeder circuit applied in a power converter according to the present disclosure. As shown by a dotted line portion in the figures, when the input current $I_{IN}$ is less than the holding current $I_H$, the primary control signal $V_{se}$ increases, such that the conduction time of the pulse-width-modulated signal $V_{PWM}$ is increased; therefore, the input current $I_{IN}$ can be maintained at the holding current $I_H$, and does not decrease. Furthermore, as conduction of the auxiliary bleeder circuit leads to generation of the bleeder current $I_b$, the auxiliary side voltage $V_{DD}$ decreases. At this time, the constant voltage controller 120 starts and outputs a constant voltage signal $V_{ecv}$ as a negative feedback of the switching signal $V_{gb}$, so as to avoid too long conduction time of the switch element $S_b$; thereby maintaining a stable auxiliary side voltage $V_{DD}$. (For reference symbols in the figures of the present disclosure, $R_{CV}$ represents a resistor, $S_1$; $S_2$, $S_3$ and $S_4$ represent switch elements; $L_f$ and $L_{out}$ represent inductors; $C_1$, $C_2$, $C_f$, $C_a$, $C_{out}$, and $C_{DD}$ represent capacitors; $D_1$, $D_2$, $D_{S1}$, $D_{S2}$, $D_S$, and $D_a$ represent diodes.)

Based on the above, the adaptive bleeder circuit of the present disclosure is not limited to be configured at the primary side or auxiliary side of the power converter, and the scope of the present disclosure is not limited by the type of the power converter. According to the embodiments of the present disclosure, the adaptive bleeder circuit may be applied to power converters of any type, and the configuration position may be independent of each other. The adaptive bleeder circuit dynamically adjusts the conduction time of the pulse-width-modulated signal input to the power converter through the bleeder circuit, such that when the input current flowing through the AC TRIAC is less than the holding current, the bleeder circuit may be used for increasing the conduction time of the pulse-width-modulated signal, thereby maintaining normal operation of the AC TRIAC.

Moreover, through a constant voltage controller, a minimum input voltage detector, and a dimming angle detection circuit of peripheral circuits, the adaptive bleeder circuit of the present disclosure may further protect the working range of the adaptive bleeder circuit, and achieve the effect that the adaptive bleeder circuit does not work when the input current is greater than the holding current, the input voltage is less than the minimum rated input voltage or the dimming angle is too low.

The adaptive bleeder current of the present disclosure may be selectively used in combination with an auxiliary bleeder circuit, so as to dynamically consume the redundant power generated by the power converter because the input current recovers to the holding current, and release the redundant energy.

What is claimed is:

1. An adaptive bleeder circuit, applicable to a power converter, wherein the power converter has a transformer primary side and a transformer secondary side, the power converter enables an input voltage to be selectively connected or not connected to the transformer primary side through a pulse-width-modulated signal, the transformer primary side has an alternating current (AC) Triode for Alternating Current (TRAIC), and the AC TRAIC has a holding current and an input current flowing through the AC TRAIC, the adaptive bleeder circuit comprising:
    a bleeder circuit, used for adjusting a switch on/off ratio (duty ratio) of the pulse-width-modulated signal according to the holding current and the input current,
    wherein when the input current is less than the holding current, the bleeder circuit increases the on-state time of the pulse-width-modulated signal, such that the input current recovers to the holding current.

2. The adaptive bleeder circuit according to claim 1, wherein the bleeder circuit is configured at the transformer primary side of the power converter, the bleeder circuit enables a bleeder resistor to selectively consume redundant power generated by the power converter when the input current recovers to the holding current by controlling the duty ratio of the pulse-width-modulated signal, and the bleeder circuit comprises:
    a first error amplifier, used for outputting a first error signal according to a current detection signal of the transformer primary side and a reference current signal, wherein the current detection signal is corresponding to the input current flowing through the AC TRIAC; and
    a first comparator, used for receiving the first error signal, comparing the first error signal with a ramp signal, and outputting the pulse-width-modulated signal.

3. The adaptive bleeder circuit according to claim 1, wherein the bleeder circuit comprises:
    a first error amplifier, used for outputting a first error signal according to a current detection signal of the transformer primary side and a reference current signal, wherein the current detection signal is corresponding to the input current flowing through the AC TRIAC;
    a second error amplifier, used for outputting a second error signal according to a sensed signal of the transformer secondary side and a reference voltage signal;
    an adder, connected to the first error amplifier and the second error amplifier, and used for outputting a primary control signal by adding the first error signal and the second error signal; and
    a first comparator, used for receiving the primary control signal, comparing the primary control signal with a ramp signal, and outputting the pulse-width-modulated signal.

4. The adaptive bleeder circuit according to claim 3, wherein the bleeder circuit further comprises an auxiliary bleeder circuit, used for outputting a switching signal, and the auxiliary bleeder circuit enables a bleeder resistor to selectively consume redundant power generated by the power converter when the input current recovers to the holding current by controlling the duty ratio of the switching signal, and the auxiliary bleeder circuit comprises:
    an amplitude limiter, connected to the adder, and used for limiting an upper limit value of the primary control signal;
    a subtractor, used for outputting a secondary control signal according to the primary control signal after amplitude limitation and a constant voltage signal; and
    a second comparator, used for receiving the secondary control signal, comparing the secondary control signal with the ramp signal, and outputting the switching signal.

5. The adaptive bleeder circuit according to claim 4, wherein the auxiliary bleeder circuit further comprises a constant voltage controller, and the constant voltage controller outputs the constant voltage signal, and ensures that power consumed by the bleeder resistor is not more than the redundant power generated when the input current recovers to the holding current.

6. The adaptive bleeder circuit according to claim 4, further comprising a switch element, connected between the subtractor and the second comparator, wherein the switch element is connected to a third comparator, and input ends of the third comparator are respectively connected to the current detection signal and the reference current signal, so as to turn off the switch element when the input current flowing through the AC TRIAC is greater than the holding current.

7. The adaptive bleeder circuit according to claim 6, wherein the switch element is further connected to a minimum input voltage detector, and the minimum input voltage detector turns off the switch element when the input voltage is less than a minimum rated input voltage.

8. The adaptive bleeder circuit according to claim 4, wherein the second comparator is further connected to a minimum input voltage detector, and the minimum input voltage detector stops the switch signal being output when the input voltage is less than a minimum rated input voltage.

9. The adaptive bleeder circuit according to claim 4, further comprising a switch element, used for receiving the switching signal output by the second comparator, wherein the switch element is connected to a third comparator, and input ends of the third comparator are respectively connected to the current detection signal and the reference current signal, so as to turn off the switch element when the input current flowing through the AC TRIAC is greater than the holding current.

10. The adaptive bleeder circuit according to claim 9, wherein the switch element is further connected to a minimum input voltage detector, and the minimum input voltage detector turns off the switch element when the input voltage is less than a minimum rated input voltage.

11. The adaptive bleeder circuit according to claim 3, wherein the bleeder circuit further comprises a dimming angle detection circuit, the dimming angle detection circuit is connected between the first comparator and the power converter, and the dimming angle detection circuit is used for stopping outputting the pulse-width-modulated signal when the input voltage is less than a minimum dimming reference signal.

12. The adaptive bleeder circuit according to claim 1, wherein the power converter is a forward converter, a half-bridge converter, a full-bridge converter, or a push-pull converter.

* * * * *